United States Patent
Kiuchi et al.

(10) Patent No.: US 8,698,815 B2
(45) Date of Patent: Apr. 15, 2014

(54) IMAGE PROCESSING APPARATUS

(75) Inventors: Yutaka Kiuchi, Kyoto (JP); Takashi Ijiri, Kyoto (JP); Yuichi Doi, Fukuchiyama (JP); Shohei Nakaoka, Ayabe (JP)

(73) Assignee: Omron Corporation, Kyoto (JP)

( * ) Notice: Subject to any disclaimer, the term of this patent is extended or adjusted under 35 U.S.C. 154(b) by 279 days.

(21) Appl. No.: 12/870,704

(22) Filed: Aug. 27, 2010

(65) Prior Publication Data

US 2011/0050889 A1 Mar. 3, 2011

(30) Foreign Application Priority Data

Aug. 31, 2009 (JP) .................. P2009-200143

(51) Int. Cl.
*G06F 15/16* (2006.01)
*G06F 9/445* (2006.01)
*G06F 5/00* (2006.01)

(52) U.S. Cl.
CPC ............. *G06F 15/16* (2013.01); *G06F 9/445* (2013.01); *G06F 5/00* (2013.01)
USPC ........................................ 345/502

(58) Field of Classification Search
CPC ..... G06F 15/16; G06F 9/5044; G06F 9/5066; G06F 9/445; G06F 5/00; G06F 9/505; G06F 9/5088; G06F 8/34; G06F 8/10; G06F 9/5083; G09G 5/363; G09G 5/393; G09G 2360/06; G06T 1/20; G06T 15/005; H04L 29/08144; H04L 29/08171; G06Q 10/06
USPC ............ 345/502; 718/105; 717/105; 348/135
See application file for complete search history.

(56) References Cited

U.S. PATENT DOCUMENTS 5,999,729 A * 12/1999 Tabloski et al. ............... 717/105
6,303,395 B1 * 10/2001 Nulman ........................ 438/14

(Continued)

FOREIGN PATENT DOCUMENTS

JP 06-083608 A 3/1994
JP 2002-163636 6/2002

(Continued)

OTHER PUBLICATIONS

Wuertz, Jorg; Oz Scheduler: A Workbench for Scheduling Problems; Nov. 16, 1996; pp. 149-156; IEEE.

(Continued)

*Primary Examiner* — Sath V Perungavoor
*Assistant Examiner* — Dakshesh Parikh
(74) *Attorney, Agent, or Firm* — Foley & Lardner LLP

(57) ABSTRACT

An image processing apparatus includes a camera interface section connected to an imaging section, a plurality of arithmetic processing sections that process the image data; a display screen output section to output display image data; an input section that accepts input from an outside; a storage section for storing a plurality of processing units used to process the image data; a processing registration section that registers a processing procedure including a combination of the processing units; a mode selection section that selectably displays a plurality of parallel processing modes indicating kinds of parallel processing and accepts the selection of the parallel processing mode from the input section; and a parallelization section that allocates processing units included in the target processing procedure to one of the plurality of arithmetic processing sections according to the parallel processing mode.

10 Claims, 16 Drawing Sheets

(56) References Cited

U.S. PATENT DOCUMENTS

| | | | |
|---|---|---|---|
| 6,330,008 B1* | 12/2001 | Razdow et al. | 715/772 |
| 6,570,592 B1* | 5/2003 | Sajdak et al. | 715/769 |
| 7,136,097 B1* | 11/2006 | Toyoda et al. | 348/222.1 |
| 2003/0157721 A1* | 8/2003 | Turner et al. | 436/34 |
| 2004/0015978 A1* | 1/2004 | Orii | 718/105 |
| 2004/0126840 A1* | 7/2004 | Cheng et al. | 435/69.1 |
| 2005/0147287 A1* | 7/2005 | Sakai et al. | 382/141 |
| 2007/0283337 A1* | 12/2007 | Kasahara et al. | 717/149 |
| 2008/0082933 A1* | 4/2008 | Howard et al. | 715/771 |
| 2008/0129740 A1* | 6/2008 | Itagaki et al. | 345/502 |
| 2008/0134075 A1 | 6/2008 | Pannese et al. | |
| 2009/0088883 A1 | 4/2009 | Baier et al. | |
| 2010/0318934 A1* | 12/2010 | Blevins et al. | 715/772 |

FOREIGN PATENT DOCUMENTS

| | | |
|---|---|---|
| JP | 2002-251610 | 9/2002 |
| JP | 2005-148901 A | 6/2005 |
| JP | 2008-140007 A | 6/2008 |
| WO | WO 99/63484 | 12/1999 |

OTHER PUBLICATIONS

Kravitz, Saul A. et al.; Logic Simulation on Massively Parallel Architectures; Computer Architecture Conference Proceedings, vol. 17, No. 3; Jun. 1989; pp. 336-343.

Shin, Kwangsik et al.; Task Scheduling algorithm using minimized duplications in homogeneous sytems; Journal of Parallel Distributed Computing, vol. 68 (2008); pp. 1146-1156.

European Patent Office extended search report on application No. 10173144.6 dated Feb. 15, 2011; 9 pages.

Office Action received in Japanese Patent Application No. 2009-200143.

* cited by examiner

IMAGE PROCESSING APPARATUS

CROSS-REFERENCE TO RELATED PATENT APPLICATIONS

Japan Priority Application 2009-200143, filed Aug. 31, 2009 including the specification, drawings, claims and abstract, is incorporated herein by reference in its entirety.

BACKGROUND OF THE INVENTION

1. Technical Field

The present invention relates to an image processing apparatus including a plurality of arithmetic processing sections.

2. Related Art

In the FA (Factory Automation) field, a so-called visual sensor is put to practical use as an apparatus that inspects a defect or a stain on an object to be measured such as a workpiece, measures dimensions thereof and the like, and recognizes a character or a graphic on the object to be measured. In the visual sensor, various kinds of image processing are performed to the measured image acquired by taking the image of the object to be measured, thereby outputting the processing result.

In the FA field, there are needs such as enhancement of a line speed and reduction of apparatus cost. In order to meet the needs, there is well known a configuration in which a plurality of processors are mounted on one image processing apparatus to perform parallel processing.

For example, Japanese Unexamined Patent Publication No. 2002-163636 discloses a visual inspection apparatus including first and second image processing systems. In the visual inspection apparatus, the first image processing system performs measurement of a target based on measurement image data (measurement mode), and the second image processing system performs settings necessary for the measurement of the target (setting mode).

Japanese Unexamined Patent Publication No. 2002-251610 discloses a parallel image processing apparatus including N image processors. In the parallel image processing apparatus, one piece of digital image data is divided into a plurality of regions where the processing is required, and the regions are allocated to the image processors to perform the parallel processing.

In the actual production line, a required function or capability depends on the needs or position of each line. On the other hand, in the related art described above, only a specific function is previously prepared, and one image processing apparatus cannot meet various needs.

In view of the foregoing, an object of the present invention is to provide an image processing apparatus and an image processing program for being able to selectively perform a plurality of pieces of parallel processing according to the needs.

SUMMARY

In accordance with one aspect of the present invention, an image processing apparatus includes a camera interface section that is connected to an imaging section, the imaging section taking an image of an object to be measured to produce image data, the image data produced by the imaging section being inputted to the camera interface section, a plurality of arithmetic processing sections that process the image data, a display screen output section that is connected to a display section to output display image data to be displayed on the display section, an input section that accepts input from an outside, a storage section for storing a plurality of processing units used to process the image data are stored, a processing registration section that registers a processing procedure, the processing procedure including a combination of the processing units selected by the input from the input section, a mode selection section that selectably displays a plurality of parallel processing modes indicating kinds of parallel processing on the display section and accepts the selection of the parallel processing mode from the input section, and a parallelization section that allocates each of a plurality of processing units included in the target processing procedure to one of the plurality of arithmetic processing sections according to the parallel processing mode selected by the mode selection section.

Preferably, the image processing apparatus further includes a comparison display output section that displays on the display section a first processing time necessary to process the target processing procedure with a single arithmetic processing section and a second processing time necessary to perform the parallel processing to the target processing procedure allocated with the parallelization section by the plurality of arithmetic processing sections.

More preferably, the comparison display output section outputs the first processing time and the second processing time in the form of numerical display.

Alternatively, more preferably, the comparison display output section outputs the first processing time and the second processing time in the form of graphic display.

Preferably, the parallelization section includes a section that determines whether an obstructive factor of speed enhancement of processing exists with respect to a processing unit included in the processing procedure, and a section for displaying a countermeasure that solves the obstructive factor on the display section when the obstructive factor of the speed enhancement of the processing exists.

Preferably, the parallelization section includes a section that computes a the processing time for each of a plurality of parallel processing modes in which each of a plurality of processing units included in the target processing procedure are allocated to one of the plurality of arithmetic processing sections, and a section that outputs the computed information on the processing time for each of the plurality of parallel processing modes to the display section such that the pieces of information on the processing time for each of the plurality of parallel processing modes can be compared to each other among the parallel processing modes.

Preferably, the image processing apparatus further includes a permutation section that changes a operation sequence of the plurality of processing units included in the target processing procedure.

Preferably, position deviation correction processing is included in the target processing procedure, and the parallelization section allocates the plurality of processing units to one of the plurality of arithmetic processing sections subsequently to the position deviation correction processing unit.

Accordingly, the pieces of image processing can be performed in parallel in an appropriate mode to the image acquired with the imaging device according to the needs in the site where the image processing apparatus is applied.

DETAILED DESCRIPTION

Figure 1:
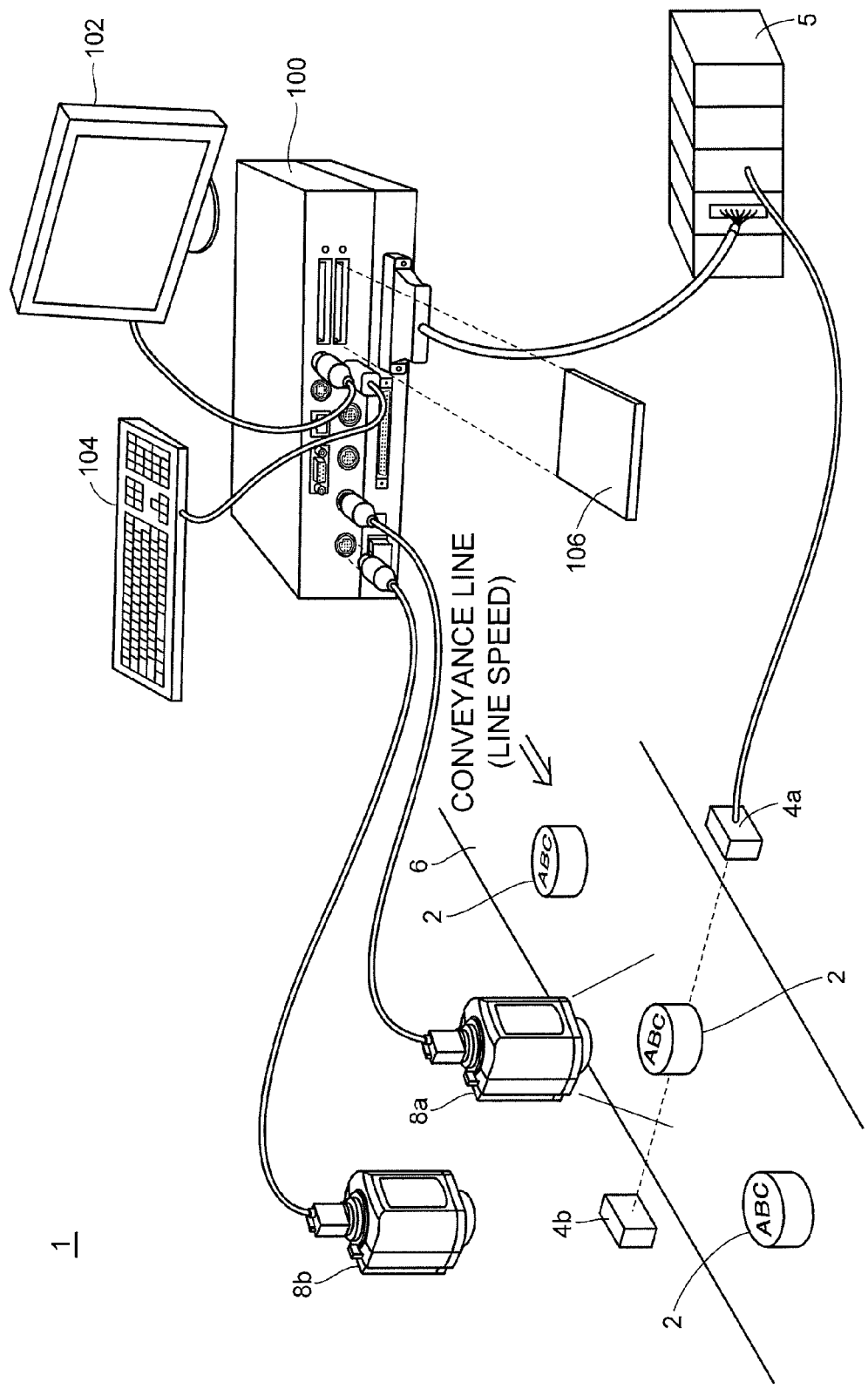
FIG. 1 is a schematic diagram showing an entire configuration of a visual sensor system including an image processing apparatus according to an embodiment of the present invention.

An embodiment of the present invention will be described with reference to the drawings. In the drawings, the identical or equivalent part is designated by the identical numeral, and the overlapping description is not made.

<Entire Configuration of Apparatus>

FIG. 1 is a schematic diagram showing an entire configuration of a visual sensor system 1 including an image processing apparatus 100 according to an embodiment of the present invention.

Referring to FIG. 1, the visual sensor system 1 is incorporated in a production line or the like to inspect existence of a defect or a stain on an object to be measured 2 (hereinafter also referred to as a "workpiece 2"), measure dimensions thereof and the like, and recognize a character, a graphic and the like on a surface thereof. By way of example, in the embodiment, the workpieces 2 are conveyed by a conveying mechanism 6 such as a belt conveyer, and an imaging device 8a sequentially takes images of the workpieces 2. In the visual sensor system 1, at least one (in the embodiment, up to four imaging devices) imaging device 8b can be connected in addition to the imaging device 8a. Hereinafter the imaging devices 8a, 8b, . . . are also collectively referred to as the "imaging device 8". The image data (hereinafter also referred to as a "camera image") acquired by the imaging device 8 is transmitted to an image processing apparatus 100. The image processing apparatus 100 performs the image processing to the camera image taken by the imaging device 8. A lighting mechanism that applies light the workpiece 2 whose image is taken by the imaging device 8 may further be provided.

A photoelectric sensor 4 disposed at both ends of the conveying mechanism 6 detects that the workpiece 2 reaches an imaging range of the imaging device 8. Specifically, the photoelectric sensor 4 includes a light receiving section 4a and a floodlighting section 4b, which are disposed on an identical optical axis, and the light receiving section 4a detects that the light emitted from the floodlighting section 4b is blocked off by the workpiece 2, thereby detecting arrival of the workpiece 2. A detection signal (hereinafter also referred to as a "trigger signal") of the photoelectric sensor 4 is outputted to a PLC (Programmable Logic Controller) 5. Alternatively, the trigger signal may directly be transmitted from the photoelectric sensor 4 to the image processing apparatus 100.

The PLC 5 controls the conveying mechanism 6 while receiving the trigger signal from the photoelectric sensor 4.

The visual sensor system 1 also includes the image processing apparatus 100, a display 102, and a keyboard 104. The image processing apparatus 100 is connected to the PLC 5, the imaging device 8, the display 102, and the keyboard 104. Instead of or in addition to the keyboard 104, a dedicated operation device (console) may be configured to be able to be connected to the image processing apparatus 100.

The image processing apparatus 100 has a "measurement mode" in which various pieces of image processing are performed to the camera image including the workpiece 2 and an "adjustment mode" in which various adjustments such as imaging setting are performed. In the measurement mode, the image processing apparatus 100 provides an imaging command to the imaging device 8 when receiving the trigger signal through the PLC 5 from the photoelectric sensor 4. The camera image acquired by taking the image of the workpiece 2 with the imaging device 8 is transmitted to the image processing apparatus 100 in response to the imaging command. Alternatively, while the imaging device 8 continuously takes the images, the image processing apparatus 100 may captures only the necessary camera image in response to the trigger signal.

The imaging device 8, by way of example, includes an imaging element, such as a CCD (Coupled Charged Device) and a CMOS (Complementary Metal Oxide Semiconductor) sensor, which is divided into plurality of pixels in addition to an optical system such as a lens.

The image processing apparatus 100 includes a computer having a general-purpose architecture as a basic structure, and the image processing apparatus 100 executes a previously installed program to provide various functions as described later. Particularly the image processing apparatus 100 includes a CPU having plurality of processor cores (hereinafter also simply referred to as the "core"), and the CPU corresponds to the plurality of arithmetic processing sections. When the general-purpose computer is used, an OS (Operating System) for providing a basic function of the computer may be installed in addition to applications for providing the functions of the embodiment. At this point, the program of the embodiment may perform the processing by calling a necessary module in a predetermined sequence and/or timing in program modules provided as part of the OS. That is, the program of the embodiment does not include the module, and occasionally the processing is performed in conjunction with the OS. Accordingly, it is not always necessary that the program of the embodiment include some of the modules.

Alternatively, the program of the embodiment may be provided while incorporated in part of another program. At this point, the program does not include the module incorporated in part of another program, but the processing is performed in conjunction with another program. That is, the program of the embodiment may be incorporated in another program.

Alternatively, some of or all the functions provided by executing the program may be mounted as a dedicated hardware circuit.

Figure 2:
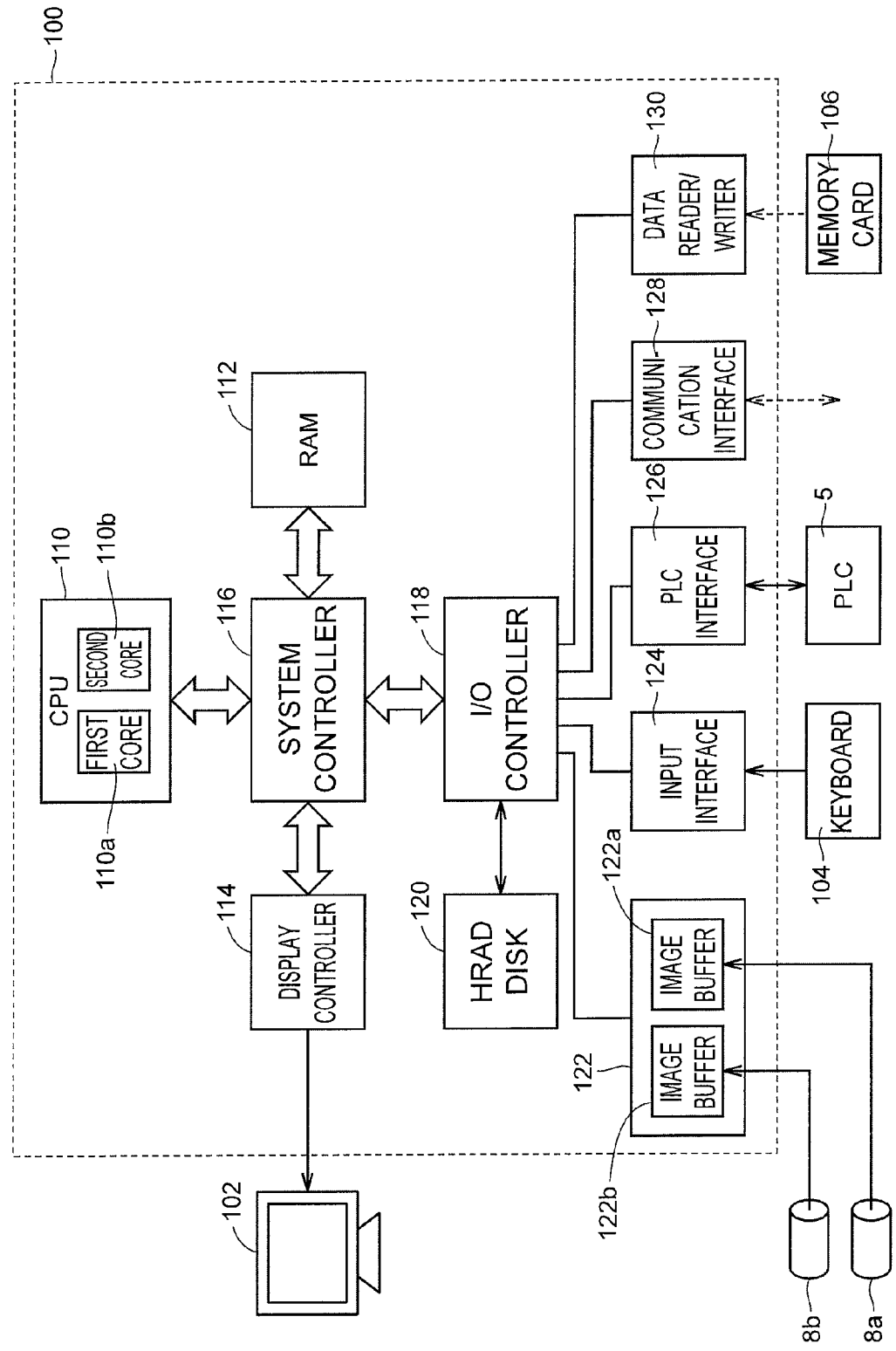
FIG. 2 is a schematic configuration diagram of the image processing apparatus according to the embodiment of the present invention.

FIG. 2 is a schematic configuration diagram of the image processing apparatus 100 according to the embodiment of the present invention. Referring to FIG. 2, the image processing apparatus 100 includes a CPU (Central Processing Unit) 110, a RAM (Random Access Memory) 112, a display controller 114, a system controller 116, an I/O (Input Output) controller 118, a hard disk 120, a camera interface 122, an input interface 124, a PLC interface 126, a communication interface 128, and a data reader/writer 130. These sections are connected to one another such that data communication can be conducted while centered on the system controller 116.

The CPU 110 includes plurality of cores (first core 110a and second core 110b) corresponding to the plurality of arithmetic processing sections. The CPU 110 exchanges the programs (codes) stored in the hard disk 120 with the system controller 116 and executes the programs in the predetermined sequence to perform various arithmetic operations. The first core 110a and the second core 110b can perform the pieces of processing independently of each other. The number of cores mounted on the CPU 110 is not limited to two, but any number of cores may be mounted within a technologically-feasible range. FIG. 2 shows the configuration (so-called multi-core processor system) in which plurality of cores are mounted on the single CPU. Alternatively, a configuration (so-called multiprocessor system) in which plurality of CPUs are mounted may be adopted. Alternatively, each of the CPUs constituting the multiprocessor system may be the multi-core processor system. That is, in the image processing apparatus of the present invention, any architecture may be adopted as long as the image processing apparatus includes the arithmetic processing sections that can perform the pieces of processing independently of each other.

Typically the RAM 112 is a volatile storage device such as a DRAM (Dynamic Random Access Memory). The camera image acquired by the imaging device 8, data indicating processing result of the camera image, and workpiece data are retained in the RAM 112 in addition to the program read from the hard disk 120.

The display controller 114 is connected to the display 102 that is of a typical example of the display device, and the display controller 114 generates display data according to an internal command from the system controller 116.

The system controller 116 is connected to the CPU 110, the RAM 112, the display controller 114, and the I/O controller 118 through a bus. The system controller 116 controls the whole of the image processing apparatus 100 while performing data exchange with each of the sections.

The I/O controller 118 controls the data exchange between the image processing apparatus 100 and a recording medium or an external device which is connected to the image processing apparatus 100. More specifically, the I/O controller 118 is connected to the hard disk 120, the camera interface 122, the input interface 124, the PLC interface 126, the communication interface 128, and the data reader/writer 130.

Typically the hard disk 120 is a nonvolatile magnetic storage device, and various setting values and the like are stored in the hard disk 120 in addition to the program executed by the CPU 110. As described later, the program installed in the hard disk 120 is distributed while stored in a memory card 106. The camera image is also stored in the hard disk 120 by logging processing to be described later. A semiconductor storage device such as a flash memory and an optical storage device such as a DVD-RAM (Digital Versatile Disk Random Access Memory) may be used instead of the hard disk 120.

The camera interface 122 mediates data transmission between the CPU 110 and the imaging device 8. More specifically, the camera interface 122 can be connected to at least one imaging device 8, and the camera interface 122 includes image buffers 122a, 122b, . . . in which the image data from the imaging device 8 is temporarily stored. Although the image buffer is shared by plurality of imaging devices 8, preferably the plurality of image buffers corresponding to the imaging devices 8 are independently disposed. When the camera image data of at least one frame is accumulated in each of the image buffers 122a, 122b, . . . , the camera interface 122 transfers the accumulated data to the I/O controller 118. The camera interface 122 provides an imaging command to the imaging devices 8a, 8b, . . . in response to an internal command from the I/O controller 118.

The input interface 124 mediates the data transmission between the CPU 110 and the input device such as the keyboard 104, a mouse, a touch panel, and a dedicated console. That is, the input interface 124 accepts an operation command that a user manipulates the input device to provide.

The PLC interface 126 mediates the data transmission between the CPU 110 and the PLC 5. More specifically, the PLC interface 126 transmits information on a state of a production line controlled by the PLC 5 or information on the workpiece to the CPU 110.

The communication interface 128 mediates the data transmission between the CPU 110 and another personal computer (not shown) or another server device (not shown). Typically the communication interface 128 includes Ethernet (registered trademark) or USB (Universal Serial Bus). Alternatively, as described later, instead of installing the program stored in the memory card 106 in the image processing apparatus 100, the program downloaded from the delivery server or the like may be installed in the image processing apparatus 100 through the communication interface 128.

The data reader/writer 130 mediates the data transmission between the CPU 110 and the memory card 106 that is of the recording medium. That is, the memory card 106 is distributed while the program executed in the image processing apparatus 100 is stored therein, and the data reader/writer 130 reads the program from the memory card 106. The data reader/writer 130 writes the camera image taken by the imaging device 8 and/or the processing result in the image processing apparatus 100 in the memory card 106 in response to the internal command of the CPU 110. The memory card 106 includes a general-purpose semiconductor storage device such as CF (Compact Flash) and SD (Secure Digital), a magnetic storage device such as Flexible Disk, and an optical storage medium such as CD-ROM (Compact Disk Read Only Memory).

Another output device such as a printer may be connected to the image processing apparatus 100 if needed.

<Outline>

In the image processing apparatus 100 of the embodiment, the image processing including at least one processing unit (hereinafter also referred to as a "processing item" or a "unit") arbitrarily selected by a user can be performed to the camera image. A performance sequence of processing items included in the image processing is determined by the user. Hereinafter image processing contents defined by the string of processing items are also referred to as a "flow". That is, the "flow" means a combination of processing units selected by the input of the user. The performance of the flow is also referred to as "performance of measurement processing". In the specification, the processing unit is a functional unit having specific use application, and input data and output data are defined in the processing unit.

In performing the flow, each of the processing items included in the flow is appropriately allocated to one of the cores constituting the CPU 110. In the image processing apparatus 100, parallelization processing can be performed in units of at least each processing item. Particularly, in the image processing apparatus 100 of the embodiment, the user can arbitrarily set how the processing item is allocated to each core according to the situation or need. That is, in the image processing apparatus 100, as described later, plurality of parallel processing modes are previously prepared, and the user can arbitrarily select one of the parallel processing modes. Therefore, the parallelization processing is performed according to the selected parallel processing mode.

Figure 3:
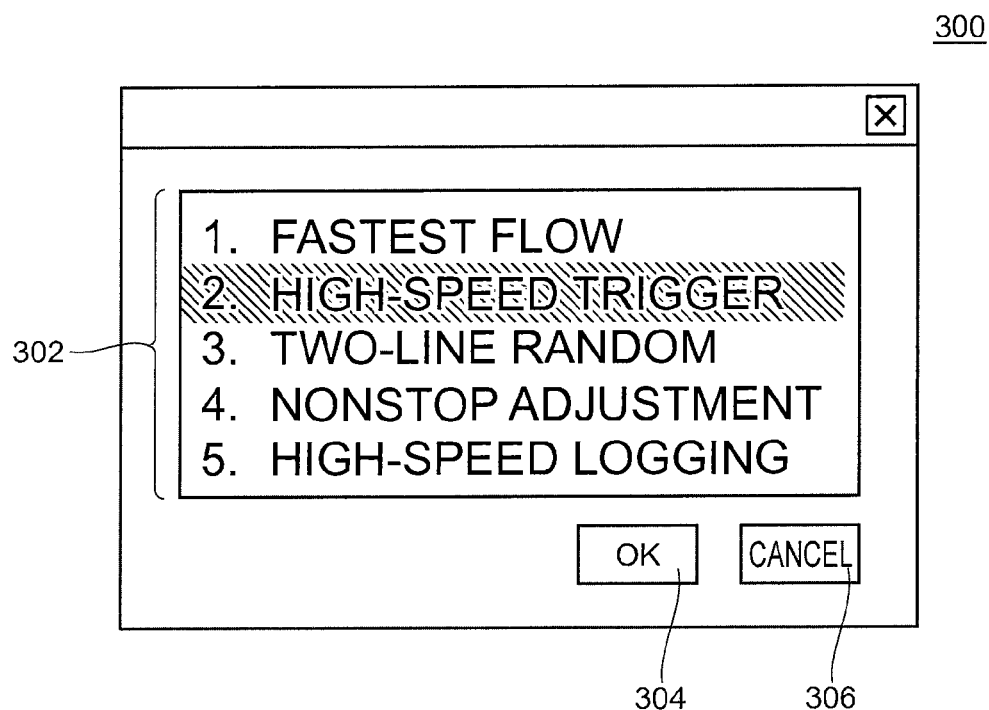
FIG. 3 is a view showing an example of a parallel processing mode selection screen provided in the image processing apparatus according to the embodiment of the present invention.

FIG. 3 is a view showing an example of a parallel processing mode selection screen 300 provided in the image processing apparatus 100 according to the embodiment of the present invention. The parallel processing mode selection screen 300 of FIG. 3 is displayed on the display 102.

Referring to FIG. 3, the parallel processing mode selection screen 300 includes a mode list display 302, an OK button 304, and a cancel button 306. Five parallel processing modes that can be performed in the image processing apparatus 100 are selectably displayed on the mode list display 302. More specifically, the image processing apparatus 100 can perform the five parallel processing modes, i.e., "fastest flow", "high-speed trigger", "two-line random", "nonstop adjustment", and "high-speed logging". The user manipulates the keyboard 104 to select the desired parallel processing mode, and then presses the OK button 304, thereby starting the performance of the selected parallel processing mode.

That is, the parallel processing mode selection screen 300 accepts the parallel processing mode selected by the user while the parallel processing modes are selectably displayed.

When the user presses the cancel button 306, the previous selection contents are canceled. The parallel processing modes will be described below in detail.

<Outline of Parallel Processing Mode>

(1. Fastest Flow Mode)

Figure 4:
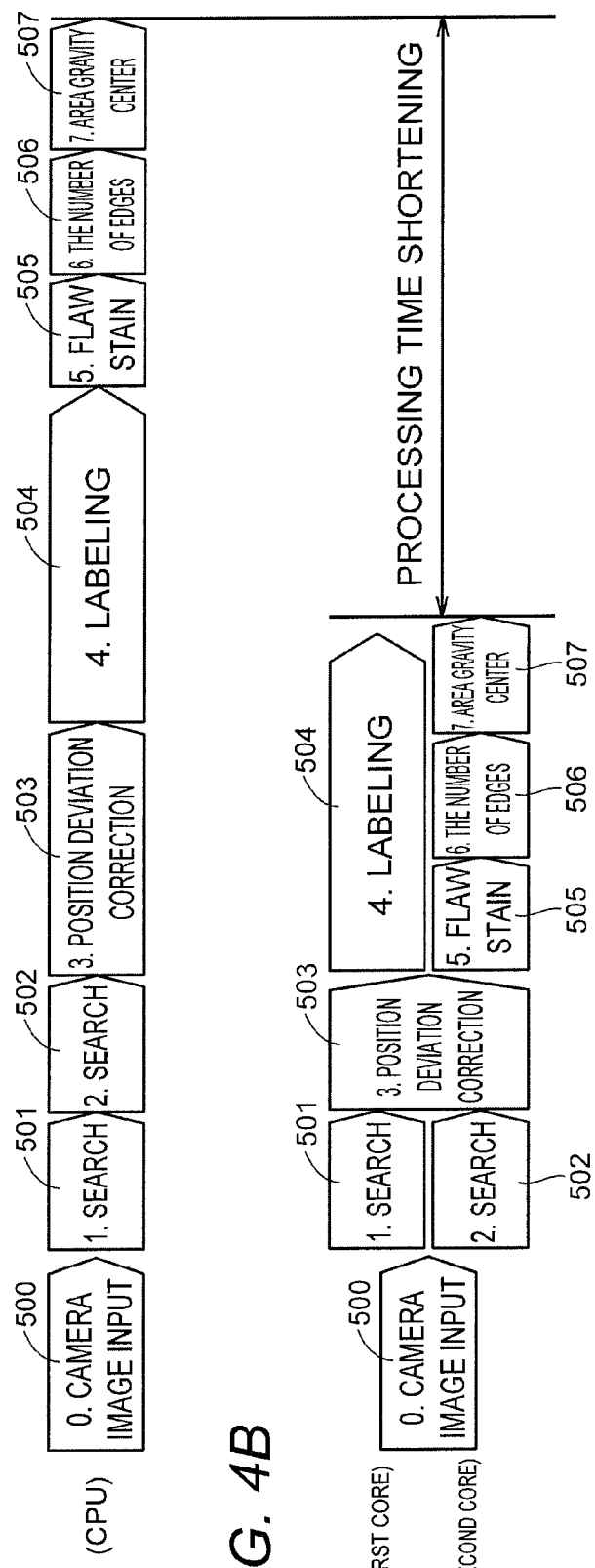
FIG. 4A to 4B are views explaining an outline of a fastest flow mode provided in the image processing apparatus according to the embodiment of the present invention.

FIG. 4 is a view explaining an outline of the fastest flow mode provided in the image processing apparatus 100 according to the embodiment of the present invention.

FIG. 4A shows a flow when the image processing apparatus on which the conventional single arithmetic processing section is mounted performs a pre-shipment inspection to a product (workpiece). The flow of FIG. 4A includes processing items, that is, camera image input 500, searches 501 and 502, position deviation correction 503, labeling 504, a flaw stain 505, the number of edges 506, and an area gravity center 507. The user can arbitrarily register contents (a kind of the processing item and the performance sequence of the processing items) of the flow.

In the processing items, the camera image input 500 corresponds to input processing, the searches 501 and 502 and the position deviation correction 503 correspond to pre-processing, and the labeling 504, the flaw stain 505, the number of edges 506, and the area gravity center 507 correspond to substantial inspection processing. Each processing item will be described below.

The camera image input 500 includes processing of taking the image of the workpiece 2 with the imaging device 8 and processing of capturing the camera image with the image processing apparatus 100. The camera image input 500 may include processing of converting a color coordinate system of the image data.

The searches 501 and 502 includes processing searching a portion (position) that is best matched with a registered model in the camera image while a feature portion printed in the workpiece 2 is previously registered as the image pattern (model). The reason the searches 501 and 502 are performed is that the position is more correctly specified by searching the feature points on the workpiece 2. The position deviation correction 503 includes processing of correcting a position deviation or an orientation deviation (rotation) of the workpiece 2 owing to the conveyance based on the search results of the searches 501 and 502. For example, when the workpiece 2 is oriented different from the original orientation owing to the conveyance of the workpiece 2 by the conveying mechanism 6, the searches 501 and 502 specify the current orientation of the workpiece 2, and pre-processing of rotating the camera image by a proper angle is performed based on the current orientation.

The labeling 504 includes processing of giving a serial number to a region having a previously registered color in the camera image. For example, when a specific mark is printed on the workpiece 2, the performance of the labeling 504 can inspect whether the same number of marks as that of the marks to be originally printed is printed.

The flaw stain 505 includes processing of detecting a flaw or a stain on the workpiece 2 based on a variation or a change in color on the camera image.

The number of edges 506 includes processing of detecting an edge based on the change in color on the camera image to acquire the number of detected edges or the edge positions. For example, the number of pins of a connector, an IC (Integrated Circuit) or the like can be inspected, and a width of each pin, or a distance between adjacent pins can be computed using the result of the number of edges 506.

The area gravity center 507 includes processing of specifying the region having the previously registered color in the camera image and of computing an area or a gravity center position with respect to the specified region. For example, using the result of the area gravity center 507, a chip or position deviation of a specific label can be inspected with respect to the workpiece 2 to which the label is attached on the surface.

As described above, the position deviation correction 503 is performed based on the search result of each of the searches 501 and 502, and the labeling 504, the flaw stain 505, the number of edges 506, and the area gravity center 507 are performed independently of one another. When the flow shown in FIG. 4A is processing using two cores, the processing items are parallelized as many as possible while constraint conditions among the processing items are satisfied.

For example, the flow of FIG. 4A is parallelized so as to be processed in the performance sequence shown in FIG. 4B. That is, the first core 110a and the second core 110b separately perform the search 501 and the search 502 in parallel. While the first core 110a performs the labeling 504, the second core 110*b* sequentially performs the flaw stain 505, the number of edges 506, and the area gravity center 507. At this point, each of the labeling 504, the flaw stain 505, the number of edges 506, and the area gravity center 507 is allocated to one of the first core 110*a* and the second core 110*b* such that an imbalance of a time necessary for the processing is not generated between the first core 110*a* and the second core 110*b*. The time necessary for each processing item is roughly estimated based on a size of the camera image and various setting values.

For the position deviation correction 503, the camera image is divided into two, and the first core 110*a* and the second core 110*b* may separately process target portions. For example, the first core 110*a* performs an upper half of the camera image while the second core 110*b* performs a lower half of the camera image.

As described above, in the fastest flow mode of the embodiment, the processing item included in the target flow is allocated in units of at least each processing item to different cores as much as possible such that the cores simultaneously perform the processing items, so that the processing time necessary to perform the one-time flow can be shortened. That is, the flow can be processed at the fastest speed. Therefore, the fastest flow mode is suitable to the production line in which the necessary time until the image processing result is outputted since the camera image of one workpiece is acquired is shortened.

(2. High-Speed Trigger Mode)

Figure 5:
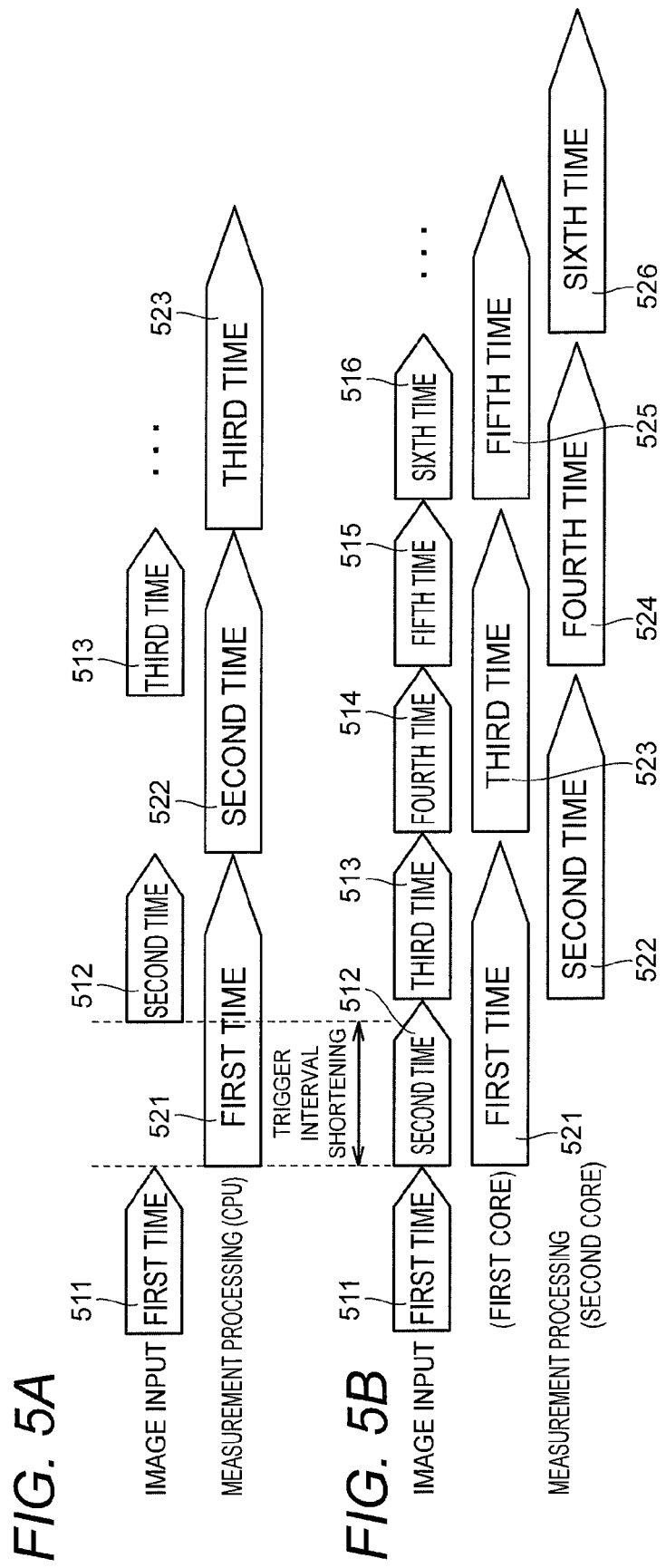
FIG. 5A to 5B are views explaining an outline of a high-speed trigger mode provided in the image processing apparatus according to the embodiment of the present invention.

FIG. 5 is a view explaining an outline of the high-speed trigger mode provided in the image processing apparatus 100 according to the embodiment of the present invention.

Referring to FIG. 5A, the imaging device 8 takes the image of workpiece 2 in each time of the generation of the trigger signal, and the camera image acquired with the imaging device 8 is inputted to the image processing apparatus 100. After the input of the camera image is completed, the image processing apparatus on which the conventional single arithmetic processing section is mounted performs the measurement processing (the flow such as the pre-shipment inspection as described above).

FIG. 5A shows the case where the time necessary to perform the corresponding work (measurement processing) is relatively longer than the time necessary for the processing of acquiring the camera image with the imaging device 8 (image input). In FIG. 5A, the CPU performs first-time measurement processing 521 in succession to the completion of a first-time image input 511. In order that the CPU performs second-time measurement processing 522 in succession to the completion of the first-time measurement processing 521, it is necessary that ending timing of a second-time image input 512 performed by the imaging device 8 be started so as to be matched with ending timing of the first-time measurement processing 521. When start timing of the second-time image input 512 is put forward, because the measurement processing does not catch up the second-time image input 512, the camera image overflows in a subsequent third-time image input 513.

That is, the time necessary for each piece of measurement processing becomes a bottleneck to restrict an interval (minimum trigger interval) at which the imaging device 8 continuously takes the images. Therefore, in the high-speed trigger mode of the embodiment, the flows are performed in parallel while the flow including the string of processing items is set to one unit.

For example, the continuous pieces of processing shown in FIG. 5A are continuously performed in a mode shown in FIG. 5B. That is, the first core 110*a* and the second core 110*b* perform odd-numbered pieces of measurement processing (flow) and even-numbered pieces of measurement processing (flow), respectively. The shooting of the imaging device 8 and the camera image input are repeatedly performed according to the continuous performance timing of the pieces of measurement processing by the first core 110*a* and the first core 110*b*.

As described above, in the parallel processing of FIG. 5B, the first core 110*a* performs the first-time measurement processing 521 in succession to the completion of the first-time image input 511. As the first core 110*a* performs the first-time measurement processing 521, the second-time image input 512 is started before the completion of the first-time measurement processing 521. The second core 110*b* performs the second-time measurement processing 522 in succession to the completion of the second-time image input 512. Similarly, third-time to sixth-time image inputs 513 to 516 are sequentially performed, the first core 110*a* performs third-time and fifth-time pieces of measurement processing 523 and 525 according to the completion of the image inputs, and the second core 110*b* performs fourth-time and sixth-time pieces of measurement processing 524 and 526.

In the high-speed trigger mode of the embodiment, the pieces of processing are parallelized in the flow unit registered by the user, so that the interval at which the new camera image is acquired with the imaging device 8, that is, an allowable trigger interval can be shortened. Accordingly, the processing time (tact time) necessary for each workpiece 2 can be shortened, a production line speed can be enhanced.

(3. Two-Line Random Mode)

Figure 6:
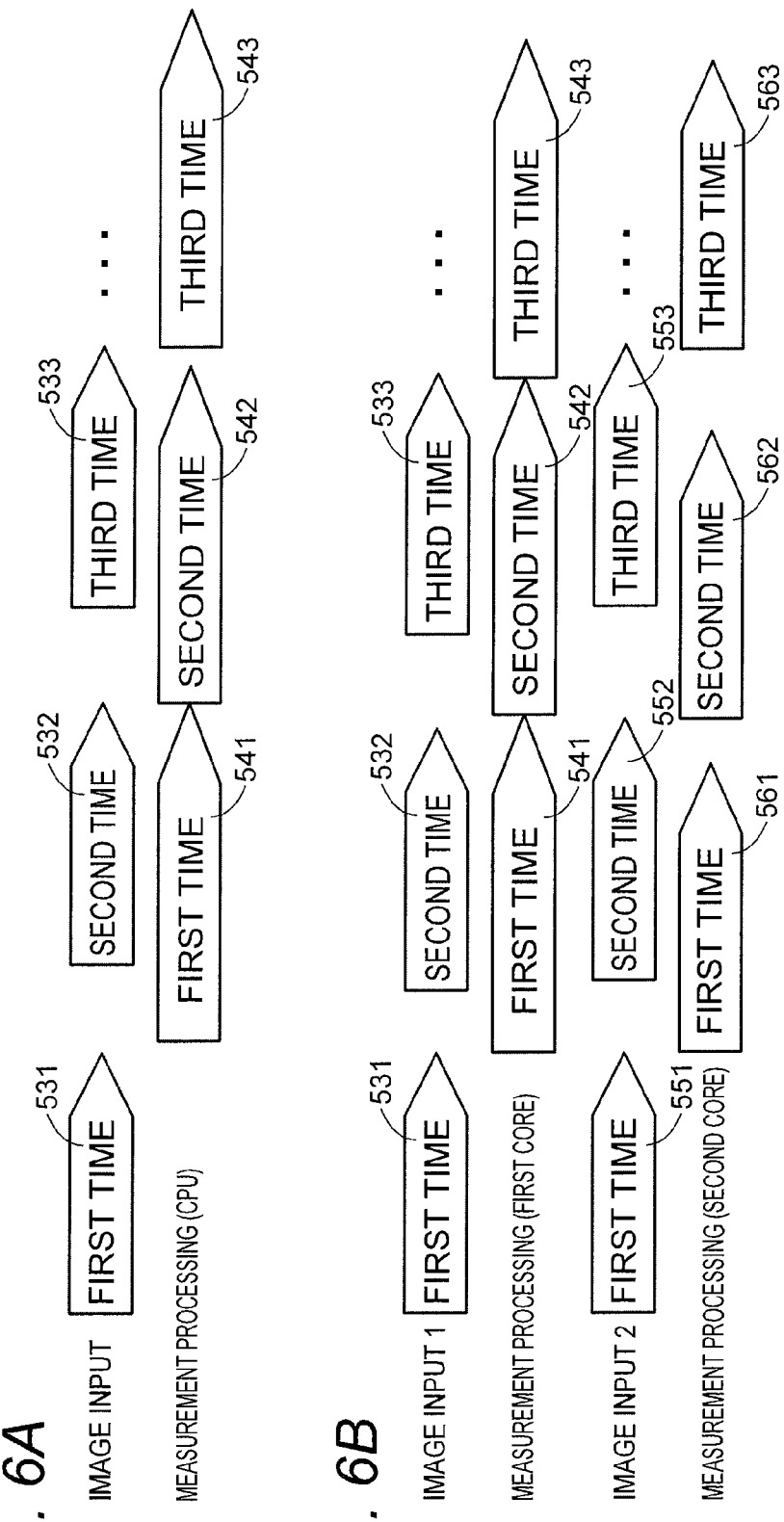
FIG. 6A to 6B are views explaining an outline of a two-line random mode provided in the image processing apparatus according to the embodiment of the present invention.

FIG. 6 is a view explaining an outline of the two-line random mode provided in the image processing apparatus 100 according to the embodiment of the present invention.

FIG. 6A shows a processing procedure in the image processing apparatus on which the conventional single arithmetic processing section connected to one imaging device is mounted. In FIG. 6A, the CPU performs first-time measurement processing 541 in succession to the completion of a first-time image input 531. The string of flows including the image inputs and the pieces of measurement processing is repeatedly performed in each time of the generation of the trigger signal.

On the other hand, in the two-line random mode of the embodiment, the string of flows including the image inputs and the pieces of measurement processing are performed independently of each other while the imaging devices 8 (the imaging devices 8*a* and 8*b* of FIG. 1) are connected to the image processing apparatus 100. Accordingly, the workpieces conveyed on the plurality of lines can be inspected in an asynchronous manner using one image processing apparatus 100. That is, in each of the plurality of lines, the corresponding flow can randomly be performed. Obviously one workpiece can be applied to processing of inspecting different items.

More specifically, as shown in FIG. 6B, for the first line, the first core 110*a* performs first-time measurement processing 541 in succession to the first-time image input 531 of the camera image acquired by taking image with the imaging device 8*a*. Similarly the string of flows including the image inputs and the pieces of measurement processing is repeatedly performed in each time of the generation of the trigger signal on the first line (the image input 532 and the measurement processing 542, and the image input 533 and the measurement processing 543).

For the first line, in asynchronization with the string of flows performed in the first core 110*a*, the second core 110*b* performs first-time measurement processing 561 in succession to first-time image input 551 of the camera image acquired by taking image with imaging device 8*b*. Similarly the string of flows including the image inputs and the pieces of measurement processing is repeatedly performed in each time of the generation of the trigger signal on the second line (the image input 552 and the measurement processing 562, and the image input 553 and the measurement processing 563).

As described above, in the two-line random mode of the embodiment, because the flows can be performed in the asynchronous manner, the plurality of items and/or the plurality of lines can be inspected in parallel using one image processing apparatus 100.

(4. Nonstop Adjustment Mode)

Figure 7:
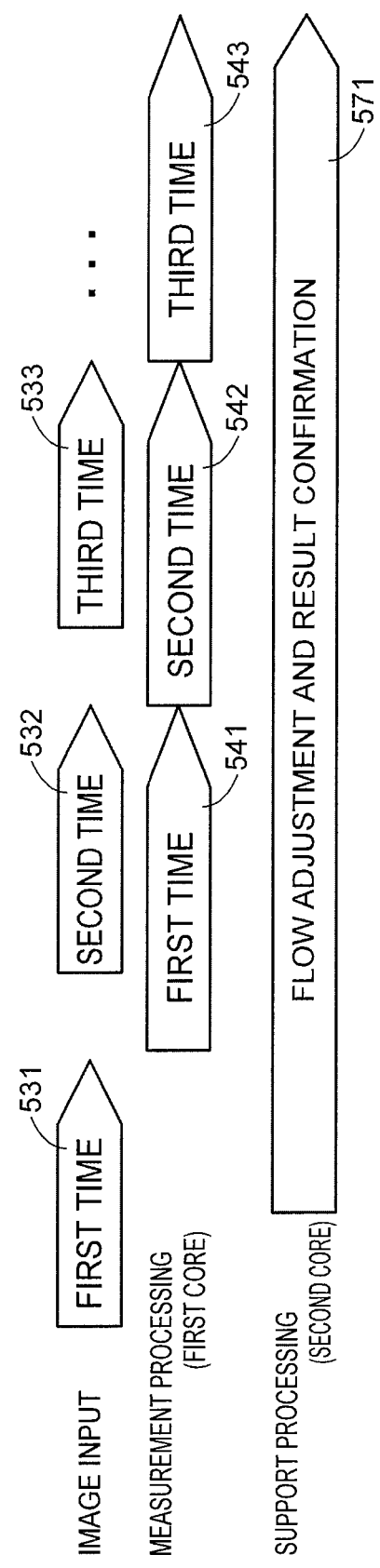
FIG. 7 is a view explaining an outline of a nonstop adjustment mode provided in the image processing apparatus according to the embodiment of the present invention.

FIG. 7 is a view explaining an outline of the nonstop adjustment mode provided in the image processing apparatus 100 according to the embodiment of the present invention.

In the nonstop adjustment mode of the embodiment, the second core 110*b* performs support processing such as flow adjustment, result confirmation, and statistical analysis while the first core 110*a* repeatedly performs the string of flows. The processing in the second core 110*b* is performed independently of the operation of the first core 110*a*.

More specifically, as shown in FIG. 7, the first core 110*a* performs the first-time measurement processing 541 in succession to the first-time image input 531 of the camera image acquired by taking the image with the imaging device 8*a*. Similarly the string of flows including the image inputs and the pieces of measurement processing is repeatedly performed in each time of the generation of the trigger signal (the image input 532 and the measurement processing 542, and the image input 533 and the measurement processing 543). The second core 110*b* performs support processing 571 independently of the string of flows performed in the first core 110*a*.

As described above, in the nonstop adjustment mode of the embodiment, because the support processing such as the flow adjustment, the result confirmation, and the statistical analysis can be performed independently of the string of flows, the flow adjustment or the setting change can be performed online (during the performance of the flow).

As described above, in the nonstop adjustment mode of the embodiment, even if some sort of trouble with the setting is found online, the cause of the trouble can be analyzed to change setting contents without stopping the measurement processing. Therefore, the generation of opportunity loss owing to the line stopping can be reduced.

(5. High-Speed Logging Mode)

Figure 8:
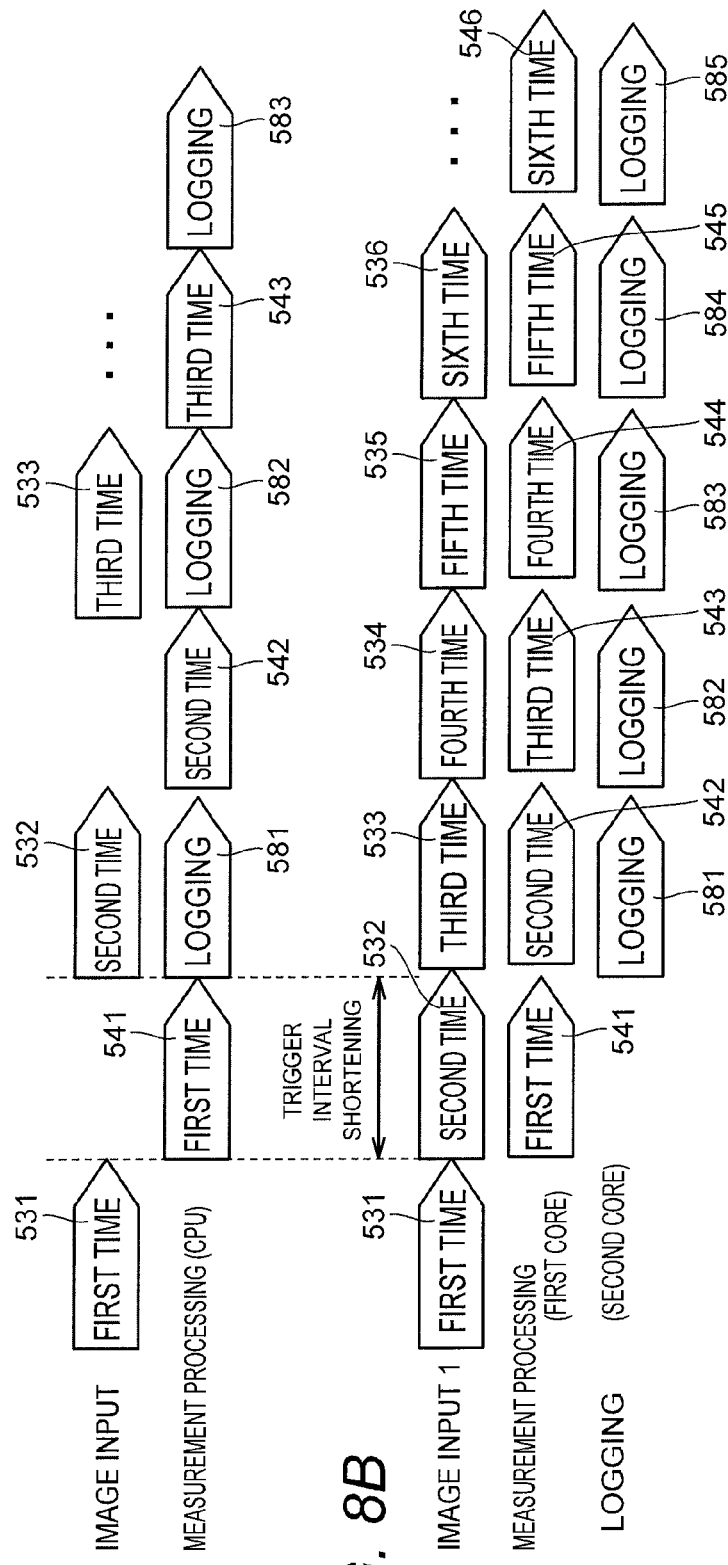
FIG. 8A to 8B are views explaining an outline of a high-speed logging mode provided in the image processing apparatus according to the embodiment of the present invention.

FIG. 8 is a view explaining an outline of the high-speed logging mode provided in the image processing apparatus 100 according to the embodiment of the present invention.

FIG. 8A shows a processing procedure in the image processing apparatus on which the conventional single arithmetic processing section is mounted. In FIG. 8A, in succession to the completion of the first-time image input 531, the CPU performs the first-time measurement processing 541 and then performs logging processing 581. The logging processing 581 is processing of storing the camera image that becomes the target of the measurement processing 541 in the storage medium such as the hard disk 120 and/or processing of outputting the camera image to a device (typically, a so-called USB memory connected through the communication interface 128) located outside the image processing apparatus. Because of the necessity of data read/write, the logging processing 581 occupies a relatively large amount of time of the CPU. Therefore, timing at which the subsequent flow can be performed is delayed after a certain flow is ended.

On the other hand, in the high-speed logging mode of the embodiment shown in FIG. 8B, the second core 110*b* performs the logging processing 581 in parallel with the operation of the first core 110*a* while the first core 110*a* performs the string of flows similarly to the conventional technique.

More specifically, as shown in FIG. 8B, the first core 110*a* performs the first-time measurement processing 541 in succession to the first-time image input 531 of the camera image acquired by taking the image with the imaging device 8*a*. Similarly the string of flows including the image inputs and the pieces of measurement processing is repeatedly performed in each time of the generation of the trigger signal (the image input 532 and the measurement processing 542, the image input 533 and the measurement processing 543, . . . ). The second core 110*b* performs pieces of logging processing 581, 582, . . . in conjunction with the string of flows performed in the first core 110*a*. Because the transmission speed in the internal bus of the image processing apparatus 100 is much higher than the write speed at which the data is written in the hard disk 120 or the transmission speed in the communication interface 128, the decrease in speed owing to the occupation of the bus can be ignored even if the camera image input and the logging processing are simultaneously performed.

As described above, in the high-speed logging mode of the embodiment, because the logging processing of the camera image is performed independently of the performance of the string of flows, a period (trigger interval) during which the string of flows is performed can be maintained to a level substantially identical to that of the case where the logging processing is not included, and the logging of the camera image can be performed without increasing the tact time. Even in a case where a trouble is generated in the image processing result, the cause of the trouble can rapidly be found by continuously performing the logging.

<User Interface>

(1. Fastest Flow Mode)

Figure 9:
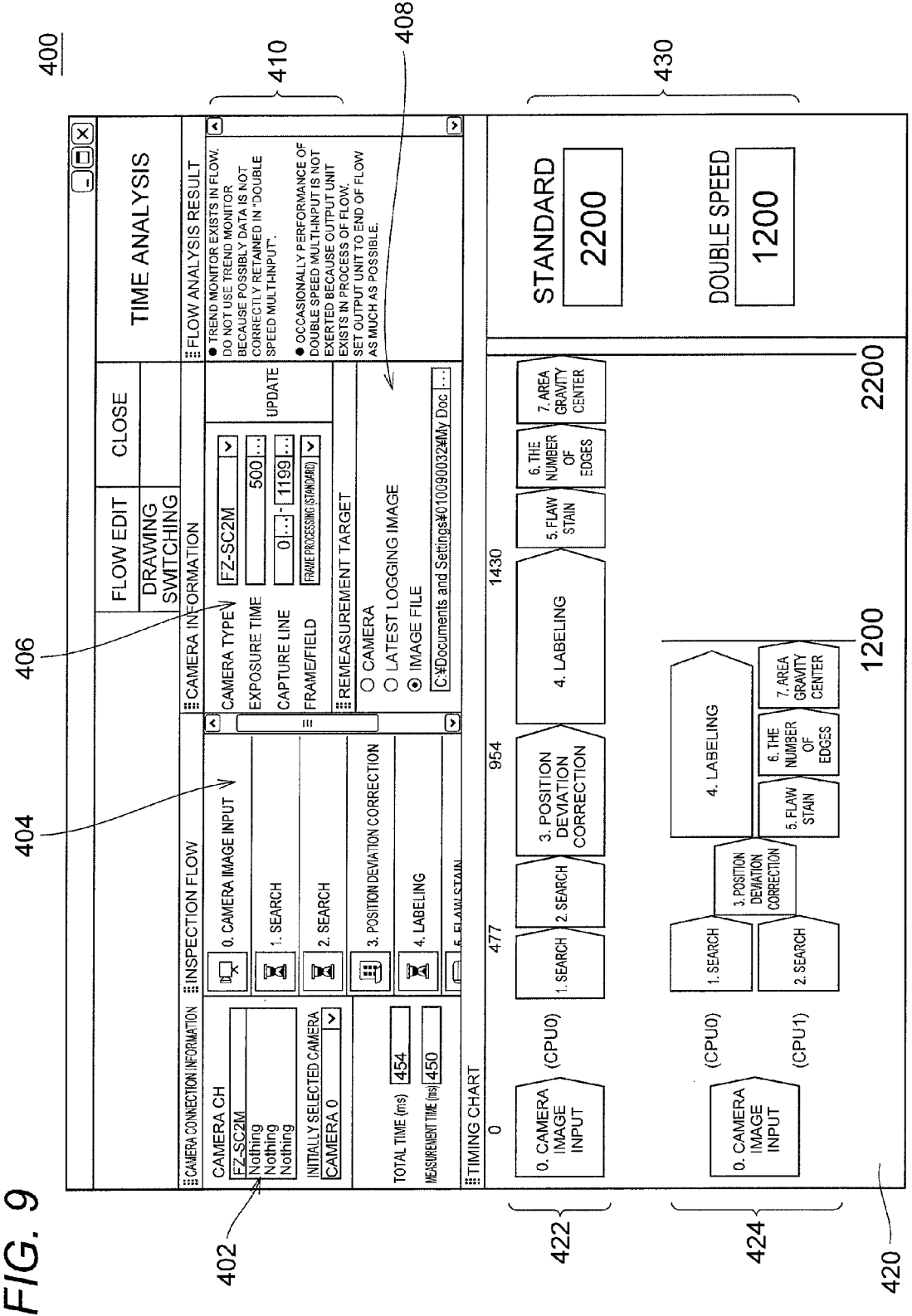
FIG. 9 is a view showing an example of a user interface screen in selecting the fastest flow mode provided by the image processing apparatus according to the embodiment of the present invention.
Figure 10:
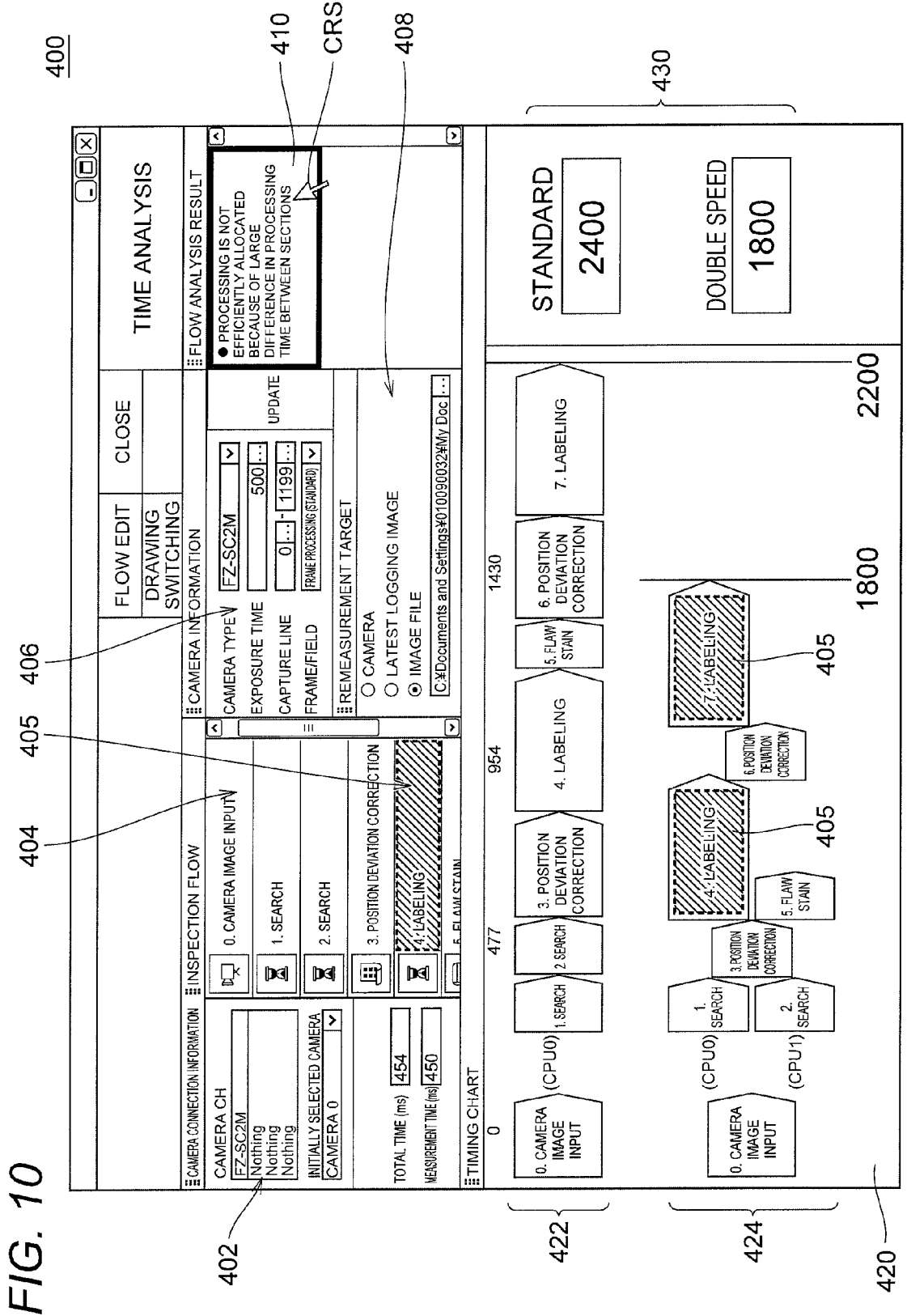
FIG. 10 is a view showing another example of the user interface screen in selecting the fastest flow mode provided by the image processing apparatus according to the embodiment of the present invention.

FIG. 9 is a view showing an example of a user interface screen 400 in selecting the fastest flow mode provided by the image processing apparatus 100 according to the embodiment of the present invention. FIG. 10 is a view showing another example of the user interface screen 400 in selecting the fastest flow mode provided by the image processing apparatus 100 according to the embodiment of the present invention.

Referring to FIG. 9, the user interface screen 400 includes a camera connection information area 402, an inspection flow area 404, a camera information area 406, a remeasurement target area 408, a flow analysis result area 410, a timing chart area 420, and a processing time display area 430.

In the camera connection information area 402 the setting manipulation of the user is accepted while the information on the imaging device 8 connected to the image processing apparatus 100 is displayed. More specifically, the camera connection information area 402 includes an item of "camera CH" indicating the information on the imaging device 8 that is currently connected to the image processing apparatus 100 and an item of "initial selection camera" for selecting the imaging device 8 selected by default.

Contents of the currently set flow are displayed in the inspection flow area 404. More specifically, the processing items included in the flow and icons are visually displayed in the inspection flow area 404 according to the performance sequence of the processing items. FIG. 9 shows the processing items included in the flow corresponding to FIG. 4.

In the inspection flow area 404, the user can change the register contents (the kind of the processing item and the performance sequence of the processing items) of the flow.

Typically the user performs a so-called drag and drop manipulation with the mouse to add or delete the processing item or to permutate the performance sequence of the processing items. That is, in response to the user manipulation, the inspection flow area 404 registers the flow including the plurality of processing items whose performance sequence is determined.

In the camera information area 406, a manipulation for changing the setting value of the imaging device 8 by the user is accepted while the current setting value of the imaging device 8 for acquiring the camera image used in the image processing is displayed. More specifically, the camera information area 406 includes items of "camera type", "exposure time", "capture line", and "frame/field". The item of "camera type" indicates information (such as model number) on the imaging device 8 used to acquire the camera image. The item of "exposure time" indicates a shutter speed in the imaging device 8 used to acquire the camera image. The item of "capture line" specifies which range in the camera image acquired in the imaging device 8 is captured using a number of a scanning line (line) of the imaging device 8. The item of "frame/field" selects whether the processing is performed in units of one field or in units of one frame in which the plurality of fields are collected, in an imaging system such as an NTSC (National Television System Committee) system in which "interlacing" scanning is performed. The camera information area 406 is activated when the imaging device 8 is specified as the image capture destination in the remeasurement target area 408 to be described later.

In the image processing apparatus 100 of the embodiment, the image processing can be performed to the image acquired in the past and the externally inputted image in addition to the mode in which the image processing is successively performed to the camera images acquired by taking the image with the imaging device 8. In the remeasurement target area 408, the setting is accepted when the image except the camera image directly inputted from the imaging device 8 becomes the processing target. More specifically, the remeasurement target area 408 includes radio buttons corresponding to three items of "camera", "latest logging image", and "image file". When the user selects the radio button corresponding to the item of "camera", the camera image acquired with the imaging device 8 connected to the image processing apparatus 100 becomes the processing target. When the user selects the radio button corresponding to the item of "latest logging image", the camera image to which the latest logging is performed becomes the processing target. When the user selects the radio button corresponding to the item of "image file", an image file stored in the specified directory (folder) becomes the processing target.

In the flow analysis result area 410, a support message such as a hint and a word of caution is displayed such that the user who has little expert knowledge can appropriately assemble or adjust the flows. In the flow analysis result area 410, the user is notified of a warning message in a situation in which the parallel processing is not efficiently performed.

In the timing chart area 420, an effect of speed enhancement of the processing by the selected parallel processing mode is visually displayed. More specifically, the timing chart area 420 includes a normal chart 422 and a speed-enhancement chart 424.

In the normal chart 422, the processing timing is visually displayed when the flow set only by one core is performed similarly to the image processing apparatus on which the conventional single arithmetic processing section is mounted. In the normal chart 422, a horizontal direction of the drawing indicates a time axis. A string of blocks corresponding to the processing items included in the target flow is disposed with widths corresponding to (predicted) processing times.

The speed-enhancement chart 424 indicating the processing timing of the selected fastest flow mode is visually displayed in parallel with the normal chart 422. In the speed-enhancement chart 424, a stage of "CPU0" indicating the first core 110$a$ and a stage of "CPU1" indicating the second core 110$b$ are provided, and a string of blocks corresponding to the processing items is disposed in synchronization with the processing timing performed in each of the cores.

In a lower portion of the timing chart area 420, the processing time (in FIG. 9, "1200" ms and "2200" ms) necessary for the string of flows is displayed in a visually recognizable mode.

As is clear from FIG. 9, compared with the case where the flow is performed using only the single arithmetic processing section, the user can immediately recognize the effect of the speed enhancement of the processing by displaying the timing chart area 420 in selecting the fastest flow mode in which the plurality of cores perform the parallelization processing. In the processing time display area 430, estimated times necessary for the pieces of processing are displayed in a contrast manner while correlated with the normal chart 422 and the speed-enhancement chart 424.

That is, in the timing chart area 420, a difference between the processing time necessary to process the target flow with the single arithmetic processing section and the processing time necessary to perform the parallel processing to the target flow with the plurality of arithmetic processing sections is displayed in a graph mode. The numerical value of the difference between the processing times is displayed in the processing time display area 430.

In the fastest flow mode of the embodiment, because the first core 110$a$ and the second core 110$b$ performs the parallelization processing in units of processing items, the effect of the speed enhancement of the processing is hardly acquired by the parallelization processing when the imbalance of the processing time is generated between the processing items.

Therefore, when the image processing apparatus 100 of the embodiment determines that an obstructive factor of the speed enhancement of the processing is generated, support display shown in FIG. 10 is performed in the user interface screen 400.

Referring to FIG. 10, when determining that the resources are not efficiently utilized, the image processing apparatus 100 notifies the user of contents that the resources are not efficiently utilized in the flow analysis result area 410 of the user interface screen 400. More specifically, in FIG. 10, the flow is set such that the two items of "labeling" are performed in series, the difference between the processing time of the initial "labeling" and the processing time of "flaw stain" that is performed in parallel with the initial item of "labeling" is relatively large, because the second core 110$b$ becomes a waiting state, the resource of the second core 110$b$ cannot efficiently be utilized.

At this point, a message that "processing is not efficiently allocated because of large difference in processing time between sections" is displayed in the flow analysis result area 410. A highlight 405 of the processing item of the cause is displayed when the user selects the message with a cursor CRS or the like. That is, the blocks of the item of "labeling" in the inspection flow area 404 and the item of "labeling" in the timing chart area 420 are highlighted.

That is, in the flow analysis result area 410, the user is notified of a countermeasure that solves the obstructive factor when the obstructive factor of the speed enhancement of the processing exists with respect to the flow.

Even if the user has little expert knowledge, the user can easily acquire the hint that improves the processing efficiency by the notification and the change of the display mode.

(2. High-Speed Trigger Mode)

Figure 11:
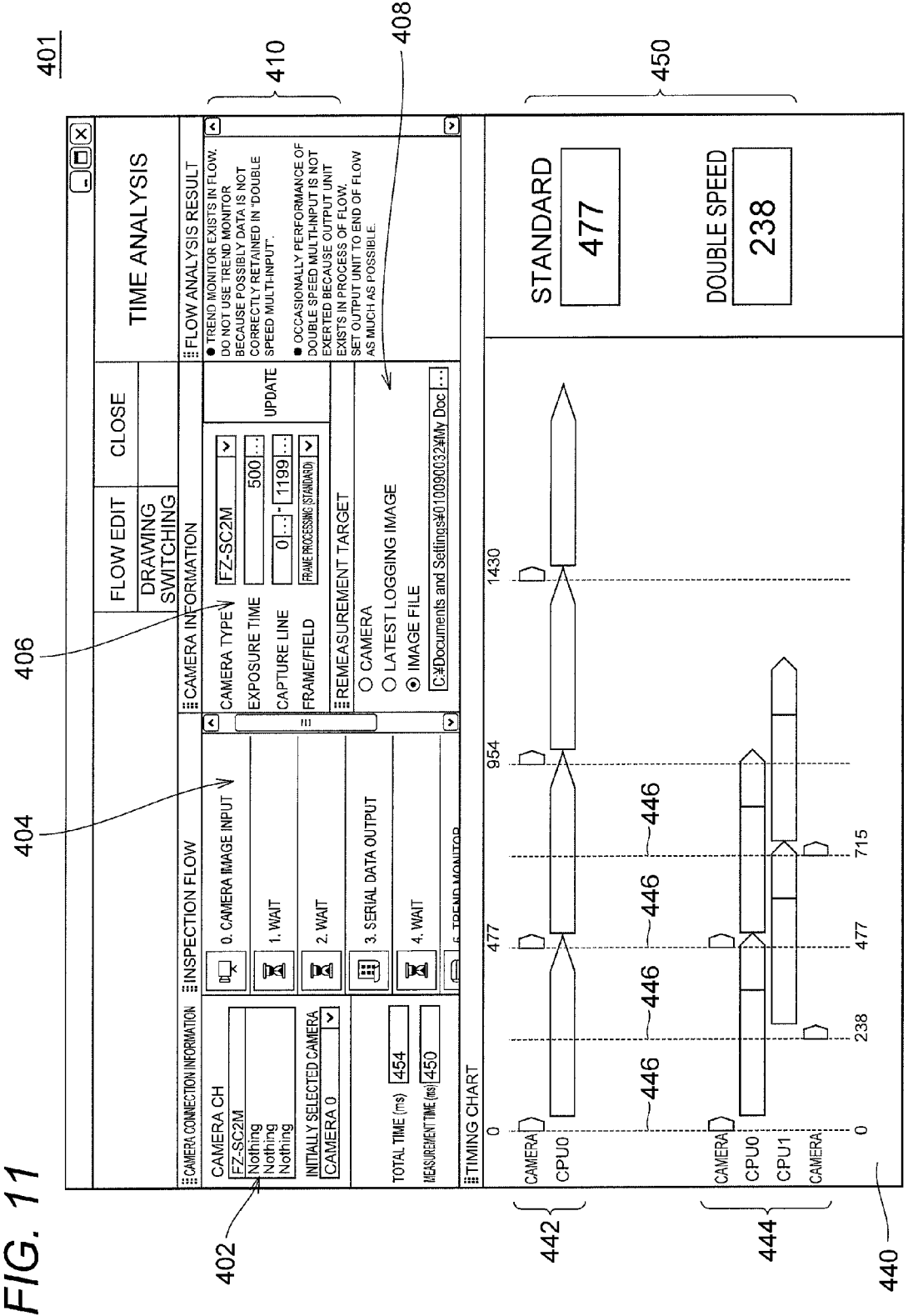
FIG. 11 is a view showing an example of a user interface screen in selecting the high-speed trigger mode provided by the image processing apparatus according to the embodiment of the present invention.
Figure 12:
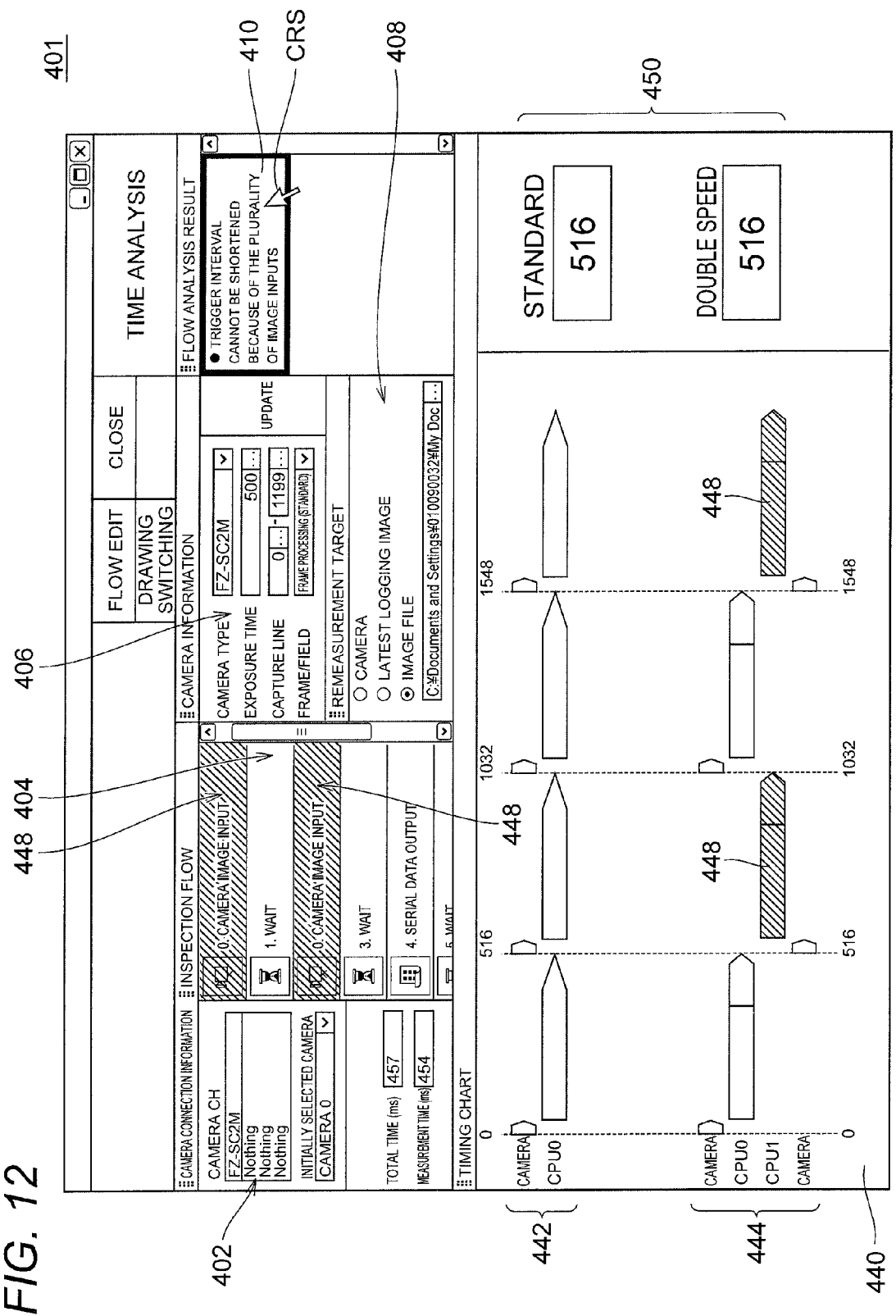
FIG. 12 is a view showing another example of the user interface screen in selecting the high-speed trigger mode provided by the image processing apparatus according to the embodiment of the present invention.

FIG. 11 is a view showing an example of a user interface screen 401 in selecting the high-speed trigger mode provided by the image processing apparatus 100 according to the embodiment of the present invention. FIG. 12 is a view showing another example of the user interface screen 401 in selecting the high-speed trigger mode provided by the image processing apparatus 100 according to the embodiment of the present invention.

Referring to FIG. 11, the user interface screen 401 includes the camera connection information area 402, the inspection flow area 404, the camera information area 406, the remeasurement target area 408, the flow analysis result area 410, a timing chart area 440, and a processing time display area 450.

Because the camera connection information area 402, inspection flow area 404, camera information area 406, remeasurement target area 408, and the flow analysis result area 410, which are included in the user interface screen 401, are similar to those of the user interface screen 400 of FIG. 9, the detailed description thereof is not repeated.

In the timing chart area 440, the effect of the speed enhancement of the processing by the selected parallel processing mode is visually displayed. More specifically, the timing chart area 440 includes a normal chart 442 and a speed-enhancement chart 444.

In the normal chart 442, the processing timing is visually displayed when the flow is set only by one core similarly to the image processing apparatus on which the conventional single arithmetic processing section is mounted. In other words, in the normal chart 442, the horizontal direction of the drawing indicates the time axis. A string of blocks corresponding to the acquisition of the camera image with the imaging device and performing the string of flows with the CPU is disposed. At this point, blocks are disposed in the stage of "camera" indicating the acquisition of the camera image while correlated with the shortest period during which the trigger signal can be accepted. The shortest period during which the trigger signal can be accepted is determined according to the processing time necessary to perform the flow to the image acquired by the previous shooting.

The speed-enhancement chart 444 indicating the processing timing of the selected high-speed trigger mode is visually displayed in parallel with the normal chart 442. In the speed-enhancement chart 444, in addition to the stage of "CPU0" indicating the first core 110a and the stage of "CPU1" indicating the second core 110b, stages of "camera" are provided while correlated with the first core 110a and the second core 110b. Strings of blocks corresponding to the processing items are disposed in the stage of "camera" and the stage of "CPU1" in synchronization with the processing timing such that the camera image acquired by taking the image with the imaging device 8 is processed by which core can be recognized.

In the timing chart area 440, the allowable trigger timing is displayed while correlated with the time axis (numeral 446).

As is clear from FIG. 11, compared with the case where the flow is performed using only the single arithmetic processing section, the user can immediately recognize the effect of the speed enhancement of the processing by displaying the timing chart area 440 in selecting the high-speed trigger mode in which the plurality of cores perform the parallelization processing. In the processing time display area 450, the allowable trigger times are displayed in the contrast manner while correlated with the normal chart 442 and the speed-enhancement chart 444.

That is, in the timing chart area 440, a difference between the allowable trigger interval in processing the target flow with the single arithmetic processing section and the allowable trigger interval in performing the parallel processing to the target flow with the plurality of arithmetic processing sections is displayed in the graph mode. The numerical value of the difference between the trigger intervals is displayed in the processing time display area 450.

In the high-speed trigger mode of the embodiment, basically the plurality of cores alternately perform the pieces of image processing (flows) to the camera images sequentially outputted by one imaging device 8, thereby further shortening the trigger interval (interval at which the imaging device 8 takes the image). Therefore, the effect of the speed enhancement of the processing is hardly acquired by the parallelization processing when the one flow includes plural-time capture of the camera image.

Therefore, when the image processing apparatus 100 of the embodiment determines that the obstructive factor of the speed enhancement of the processing is generated, support display shown in FIG. 12 is performed in the user interface screen 401.

Referring to FIG. 12, when determining that the optimum parallelization is not performed due to the hardware constraint or the flow setting, the image processing apparatus 100 notifies the user of contents that the optimum parallelization is not performed in the flow analysis result area 410 of the user interface screen 401. More specifically, in FIG. 12, because the flow is set such that the two items of "camera image input" are performed in series, the first core 110a and the second core 110b cannot alternately perform the flows.

At this point, a message that "trigger interval cannot be shortened because of the plurality of camera image inputs" is displayed in the flow analysis result area 410. A highlight 448 of the processing item of the cause is displayed when the user selects the message with the cursor CRS or the like. More specifically, the blocks of the item of "camera image input" in the inspection flow area 404 and the processing items from the second camera image input in the timing chart area 440 are highlighted.

That is, in the flow analysis result area 410, the user is notified of the countermeasure that solves the obstructive factor when the obstructive factor of the speed enhancement of the processing exists with respect to the flow.

Even if the user has little expert knowledge, the user can easily acquire the hint that improves the processing efficiency by the notification and the change of the display mode.

(3. Other Modes)

Because the items of "two-line random", "nonstop adjustment", and "high-speed logging" are similar to those of the user interface screens 400 and 401, the detailed description thereof is not repeated.

<User Support Function>

As described above, in the image processing apparatus 100 of the embodiment, the parallel processing modes can arbitrarily be selected. However, the user who has little expert knowledge cannot immediately recognize which parallel processing mode is optimum in the target production line. Therefore, the image processing apparatus 100 of the embodiment compares and displays the already set flows in order to recognize which parallel processing mode is optimum, thereby supporting the setting of the user. The user support function will be described below.

Figure 13:
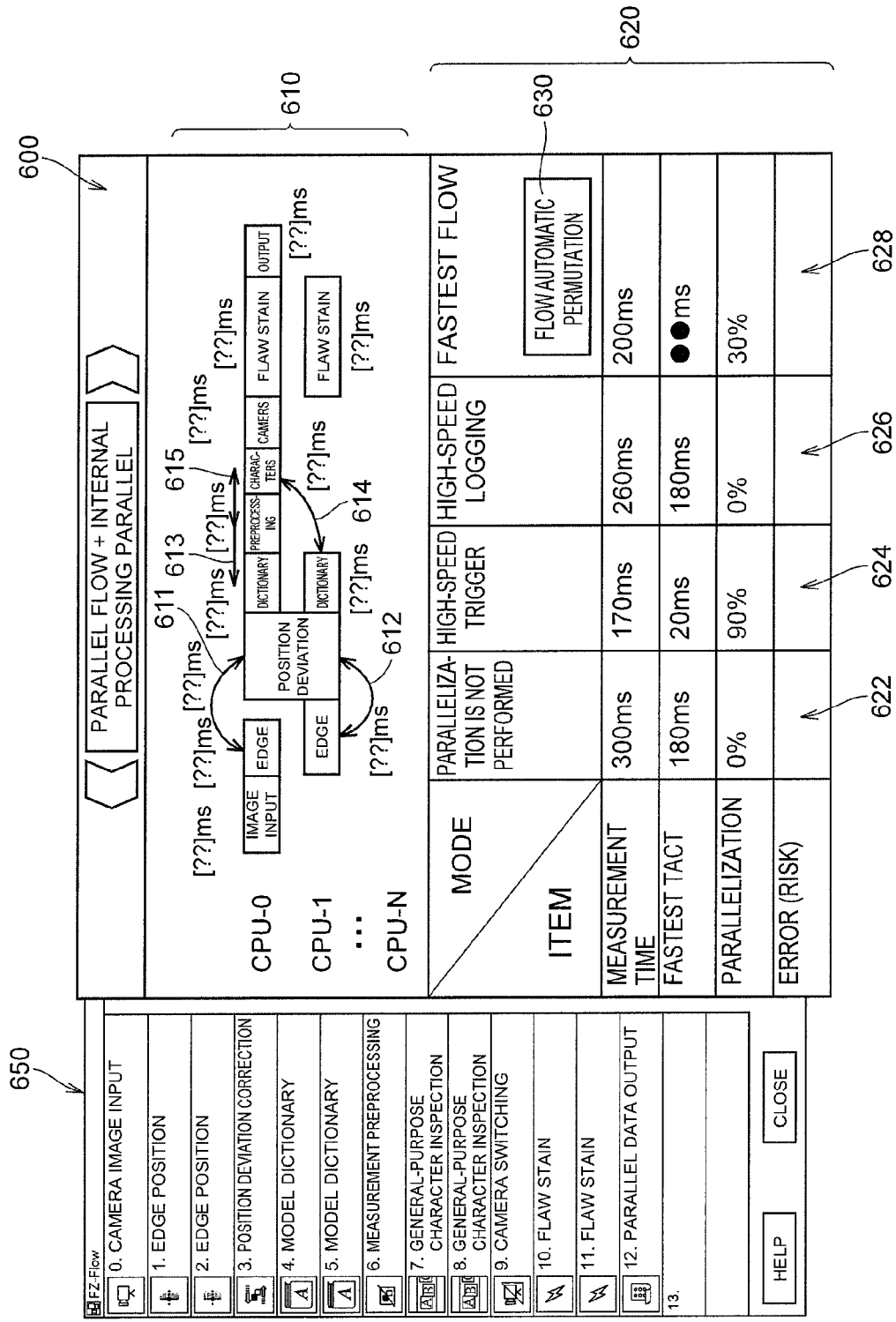
FIG. 13 is a view showing an example of a user interface screen for supporting the parallel processing mode selection provided by the image processing apparatus according to the embodiment of the present invention.

FIG. 13 is a view showing an example of a user interface screen 600 for supporting the parallel processing mode selection provided by the image processing apparatus 100 according to the embodiment of the present invention.

Referring to FIG. 13, the user interface screen 600 includes a timing chart area 610 and a list display area 620. A flow display window 650 is displayed on the display 102 in parallel with the user interface screen 600.

In the flow display window 650, a list of the processing items included in the currently set flow is visually displayed along with the icons thereof according to the performance sequence. The user performs the drag and drop manipulation to the flow display window 650 using the mouse to add or delete the processing item or to permutate the performance sequence of the processing items. That is, in the flow display window 650, the flow including the processing items whose performance sequence is determined is registered in response to the user operation. In association with the performance of permutation processing of the processing items as described later, the change of the performance sequence of the processing items is reflected in the flow display window 650 as needed. FIG. 13 shows the flow including 13 processing items.

When the currently set flow is performed according to the selected parallel processing mode, performance timing of each of the processing items included in the flow is visually displayed in the timing chart area 610. That is, in the timing chart area 610, the horizontal direction of the drawing indicates the time axis, and the string of blocks corresponding to the processing items is disposed with the widths corresponding to the (predicted) processing times. In the timing chart area 610, information on the processing speed is displayed adjacent to the block corresponding to each processing item.

In the flow set by the user, a relationship between the processing item in the fore-stage and the processing item in the subsequent stage is previously determined with respect to each processing item, indicators 611 to 615 indicating dependence relationships are displayed between the string of processing items in which the sequence cannot be replaced based on the information on the relationship. In FIG. 13, the existence of the dependence relationship (numeral 611) between "1. edge position" and "3. position deviation correction" and the existence of the dependence relationship (numeral 612) between "2. edge position" and "3. position deviation correction" are visually displayed. The existence of the dependence relationship (numeral 613) between "4. model dictionary" and "7. general-purpose character inspection" and the existence of the dependence relationship (numeral 614) between "5. model dictionary" and "7. general-purpose character inspection" are visually displayed. The existence of the dependence relationship (numeral 615) between "6. measurement pre-processing" and "7. general-purpose character inspection" is visually displayed.

In the list display area 620, the processing time predicted in selecting each parallel processing mode is displayed while compared to the processing time predicted in not performing the parallelization processing. More specifically, the list display area 620 includes display columns 622, 624, 626, and 628.

The display column 622 indicates information when the parallelization processing is not performed, the display column 624 indicates information when the high-speed trigger mode is selected, the display column 626 indicates information when the high-speed logging mode is selected, and display column 628 indicates information when the fastest flow mode is selected.

Each of the display columns 622, 624, 626, and 628 includes an item of "measurement time" indicating the processing time of the set whole flow, an item of "fastest tact" indicating an allowable minimum time of the trigger interval, an item of "parallelization" indicating an amount of processing time shortened by adoption of the parallelization processing, and an item of "error (risk)" displaying the generated trouble. That is, the information indicating the performance state of the processing predicted in selecting the corresponding parallel processing mode is displayed in each of the display columns 622, 624, 626, and 628.

As to the value of "parallelization" of the embodiment, a reduction ratio of the processing time (measurement time) necessary to perform the target flow is used when each of the parallel processing modes is selected, based on the processing time (measurement time) necessary to perform the target flow in not performing the parallelization processing. Alternatively, a reduction ratio of the allowable trigger interval (fastest tact) is used when each of the parallel processing modes is selected, based on the allowable trigger interval (fastest tact) in not performing the parallelization processing. Alternatively, a value in which the reduction ratios are comprehensively evaluated may be used.

Basically, the value of "parallelization" is preferably designed so as to increase, as the processing time necessary to perform the flow shortened, or as the allowable trigger interval is shortened. Therefore, the user can intuitively select the parallel processing mode in which the value of "parallelization" becomes the maximum as the optimum mode.

In the image processing apparatus 100, when each of the processing items included in the target flow is parallelized according to each of the parallel processing modes, the information on the processing speed is estimated for each of the parallel processing modes, and the information on the estimated processing speed in each of the parallel processing modes is displayed in a mode in which the pieces of information on the estimated processing speed can be compared in the parallel processing modes.

A "flow automatic permutation" button 630 used to instruct the permutation of the processing items included in the target flow is selectably displayed in the display column 628 such that the processing time can further be shortened. A permutation selection screen 700 shown in FIG. 14 is displayed when the user selects the button 630.

Figure 14:
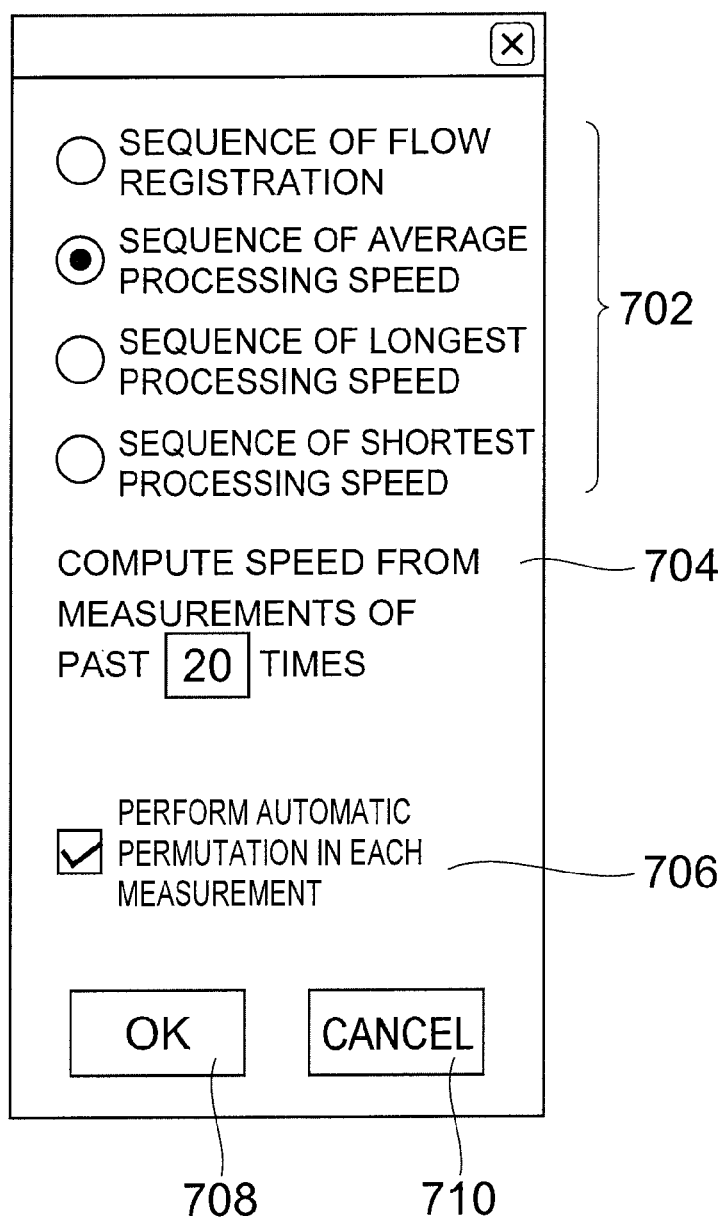
FIG. 14 is a view showing an example of a permutation selection screen provided by the image processing apparatus according to the embodiment of the present invention.

FIG. 14 is a view showing an example of the permutation selection screen 700 provided by the image processing apparatus 100 of the embodiment.

Referring to FIG. 14, in the permutation selection screen 700, the instruction of the permutation of the performance sequence of the processing items included in the target flow is provided when the fastest flow mode is selected. The permutation selection screen 700 includes a selection list 702 including plurality of rules for permutating the performance sequence of the processing items. One of "sequence of flow registration", "sequence of average processing speed", "sequence of longest processing speed", and "sequence of shortest processing speed" can be selected in the selection list 702. When the user selects one of the radio buttons, the corresponding rule is activated. When "sequence of flow registration" is selected, the permutation is performed in the sequence in which the processing items are initially registered as the flow. When "sequence of average processing speed" is selected, the permutation is performed based on the average value of the times necessary to actually perform the processing items. When "sequence of longest processing speed" is selected, the permutation is performed based on the maximum value in the times necessary to actually perform the processing items. When "sequence of shortest processing speed" is selected, the permutation is performed based on the minimum value in the times necessary to actually perform the processing items.

The sequence of the processing items can be optimized by performing the permutation of the processing items such that parallelization efficiency becomes the highest. For "sequence of average processing speed", "sequence of longest processing speed", and "sequence of shortest processing speed", which range in the actual performance in the past is used to compute the processing speed is specified based on a setting value inputted to a processing speed computing setting 704. In FIG. 14, because "20" is set in the processing speed computing setting 704, the processing speed (time necessary for the performance) is computed based on the 20-times performance results from the latest performance result.

The permutation selection screen 700 also includes a check box 706 that updates the processing speed (time necessary for the performance) in association with the performance of the measurement processing (flow) while specifying whether the permutation is performed again based on the updated processing speed. When the check box 706 is checked (selected), the processing items included in the flow are dynamically permutated according to the processing time that is actually measured by performing the flow. On the other hand, when the check box 706 is not checked, the current sequence of the processing items is not changed until the user performs some sort of manipulation.

The specified contents are reflected when the user selects an OK button 708, and the specified contents are canceled to return to the user interface screen 600 when the user selects the cancel button 710.

Thus, the image processing apparatus 100 changes (permutates) the performance sequence of the processing items included in the target flow according to the rule selected from the plurality of rules by the user.

<Control Structure>

A control structure that provides various functions in the image processing apparatus 100 will be described below.

Figure 15:
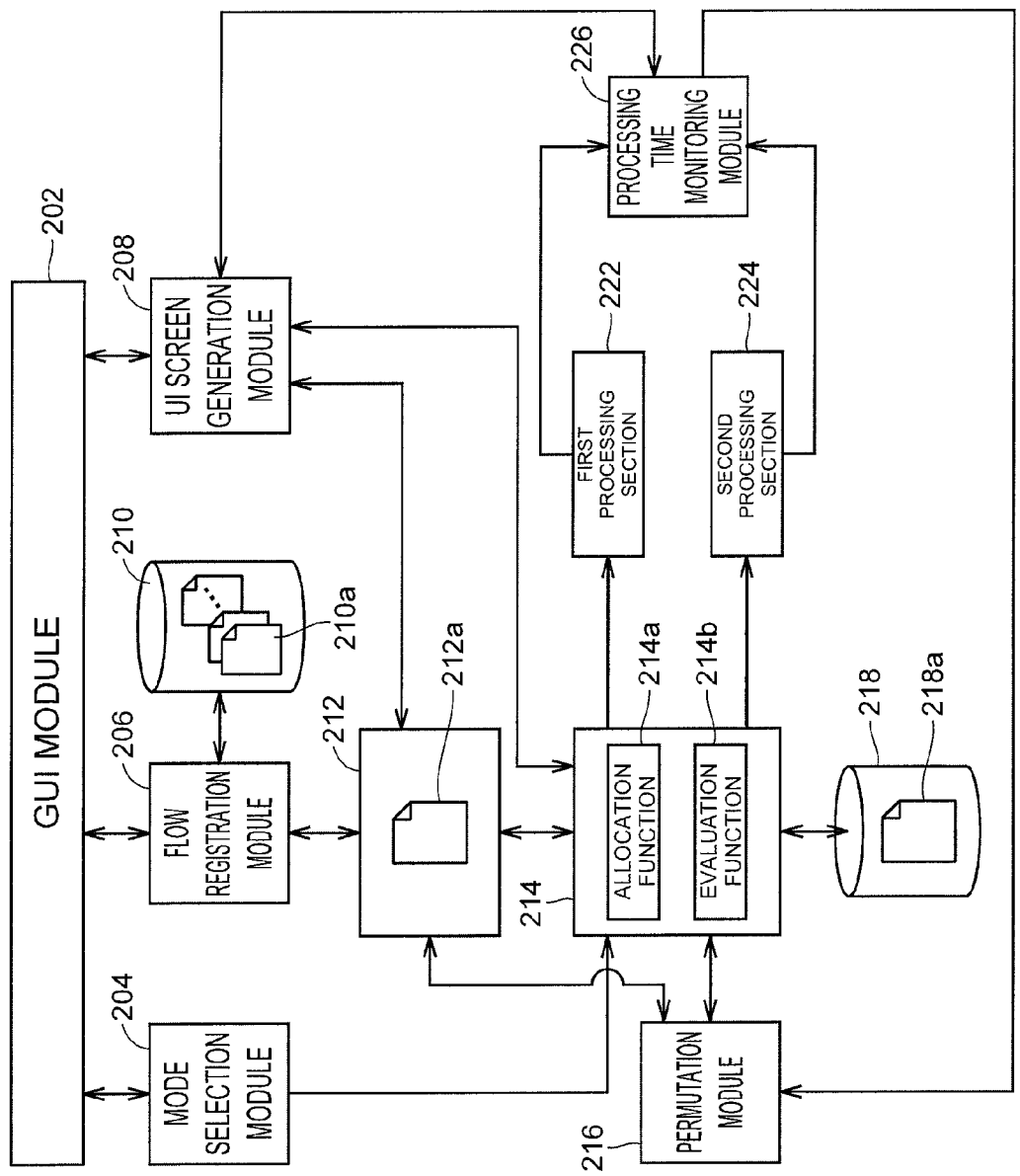
FIG. 15 is a block diagram showing an example of a control structure realized in the image processing apparatus according to the embodiment of the present invention.

FIG. 15 is a block diagram showing an example of the control structure realized in the image processing apparatus 100 according to the embodiment of the present invention. The system controller 116 expands the program (code) stored in the hard disk 120 into the RAM 112, and the system controller 116 causes the CPU 110 to execute the program, thereby providing each block shown in FIG. 15. Occasionally some of or all the modules shown in FIG. 15 are provided by firmware mounted on hardware. Alternatively, part or whole of the control structure shown in FIG. 15 may be realized by dedicated hardware and/or a wiring circuit.

Referring to FIG. 15, the image processing apparatus 100 includes a GUI (Graphical User Interface) module 202, a mode selection module 204, a flow registration module 206, a UI (user interface) screen generation module 208, a processing item retaining section 210, a flow retaining section 212, a parallelization module 214, a permutation module 216, a first processing section 222, a second processing section 224, a processing time monitoring module 226, and a parallelization standard retaining section 218 as the control structure thereof.

The GUI module 202 accepts a command in response to the user manipulation performed to the input screen while displaying the various screens as described above on the display 102 in conjunction with the mode selection module 204, the flow registration module 206, and the UI screen generation module 208. Occasionally some or all the functions of the GUI module 202 are provided as basic functions of the OS.

The mode selection module 204 notifies the parallelization module 214 of the selected parallel processing mode while accepting the parallel processing mode selected by the user. That is, the mode selection module 204 provides a function of selectably displaying the plurality of parallel processing modes on the display 102 connected to the image processing apparatus 100 and a function of accepting the parallel processing mode selected by the user. More specifically, the mode selection module 204 accepts the parallel processing mode specified on the parallel processing mode selection screen 300 while outputting the drawing data to the GUI module 202 in order to display the parallel processing mode selection screen 300 of FIG. 3.

The flow registration module 206 stores the registered flow contents in the flow retaining section 212 while accepting the flow registered by the user. That is, the flow registration module 206 provides a function of registering the flow including the processing items whose performance sequence is determined in response to the user operation. More specifically, the flow registration module 206 refers to a processing item list 210a stored in the processing item retaining section 210 and outputs drawing data to the GUI module 202 in order to display the flow display window 650 of FIG. 13. The flow registration module 206 also selects pieces of specified information from the processing item list 210a in response to the user manipulation and sequentially outputs the pieces of information to the flow retaining section 212.

The processing item retaining section 210 retains a processing item list 210a in which the pieces of information (code) indicating contents of the processing items being able to be performed by the image processing apparatus 100 and default setting values are described. That is, the processing item retaining section 210 stores plurality of processing units used to process the image data therein. Pieces of information such as the dependence relationship between the processing items are also defined in the processing item list 210a.

The flow retaining section 212 retains a flow definition 212a that is of a list in which the information on the registered flow, that is, the processing items selected by the user are arrayed in the specified sequence. At least input destination data of each processing item and output data are defined in the flow definition 212a.

The parallelization module 214 causes one of the first processing section 222 and the second processing section 224 to perform each of the processing items included in the target flow based on the flow definition 212a retained by the flow retaining section 212. That is, the parallelization module 214 provides a function of allocating each of the processing items included in the target flow to one of the arithmetic processing sections according to the parallel processing mode selected by the user. More specifically, the parallelization module 214 includes an allocation function 214a and an evaluation function 214b.

The allocation function 214a allocates each of the processing items included in the target flow to one of the first processing section 222 and the second processing section 224 by referring to a parallelization standard 218a stored in the parallelization standard retaining section 218. A rule that allocates the processing items is defined in the parallelization standard 218a. For example, an algorithm is defined that evaluates the processing times necessary to perform the processing items allocated to the first processing section 222 and the second processing section 224 such that the imbalance is not generated between the evaluated processing times.

The evaluation function 214b refers to the parallelization standard 218a stored in the parallelization standard retaining section 218 and evaluates whether the speed enhancement of the processing is obstructed and/or whether the constraint that obstructs the speed enhancement of the processing exists with respect to the state after the processing items are allocated according to some sort of rule. That is, the evaluation function

214b provides a function of displaying a difference between the processing time necessary to process the target flow with the single CPU and the processing time necessary to perform the parallel processing to the target flow with the plurality of cores.

In addition to the above-described rules, the parallelization standard 218a includes a condition that determines the situation in which the speed enhancement of the processing is obstructed and support messages such as the hint or word of caution corresponding to each condition. When the determination that some sort of obstructive situation or some sort of constraint exists is made, the evaluation function 214b outputs the information indicating contents of the obstructive situation or constraint and the support message to the UI screen generation module 208. That is, the evaluation function 214b provides a function of determining whether the obstructive factor of the speed enhancement of the processing exists with respect to the processing items included in the target flow and a function of notifying the user of the countermeasure that solves the obstructive factor when the obstructive factor of the speed enhancement of the processing exists.

The evaluation function 214b also provides a function of estimating the information on the processing speed in each of the plurality of parallel processing modes when each of the plurality of processing units included in the target flow are allocated to one of the plurality of cores according to each of the parallel processing modes and a function of displaying the pieces of estimated information on the processing speed in each of the parallel processing modes so as to be able to compare the pieces of information between the modes.

The permutation module 216 changes the performance sequence of the processing items described in the flow definition 212a. That is, the permutation module 216 provides a function of changing the performance sequence of the processing items included in the target flow according to the rule selected from the plurality of rules by the user. More specifically, the permutation module 216 changes the sequence of the processing items according to the specified rule in response to the user operation on the permutation selection screen 700 (see FIG. 14). At this point, the permutation module 216 acquires the time necessary to perform each of the processing items from the processing time monitoring module 226.

The parallelization standard retaining section 218 retains the parallelization standard 218a in which the algorithm or rule that parallelizes the processing items as described above is described.

The first processing section 222 and the second processing section 224 perform the processing items allocated by the parallelization module 214, respectively.

The processing time monitoring module 226 monitors the processing performance state in each of the first processing section 222 and the second processing section 224. That is, the processing time monitoring module 226 monitors the processing times of the processing items performed in the first processing section 222 and the second processing section 224 and retains the values of the processing times as a history.

<Processing Procedure>

A processing procedure in the image processing apparatus 100 will be described below.

Figure 16:
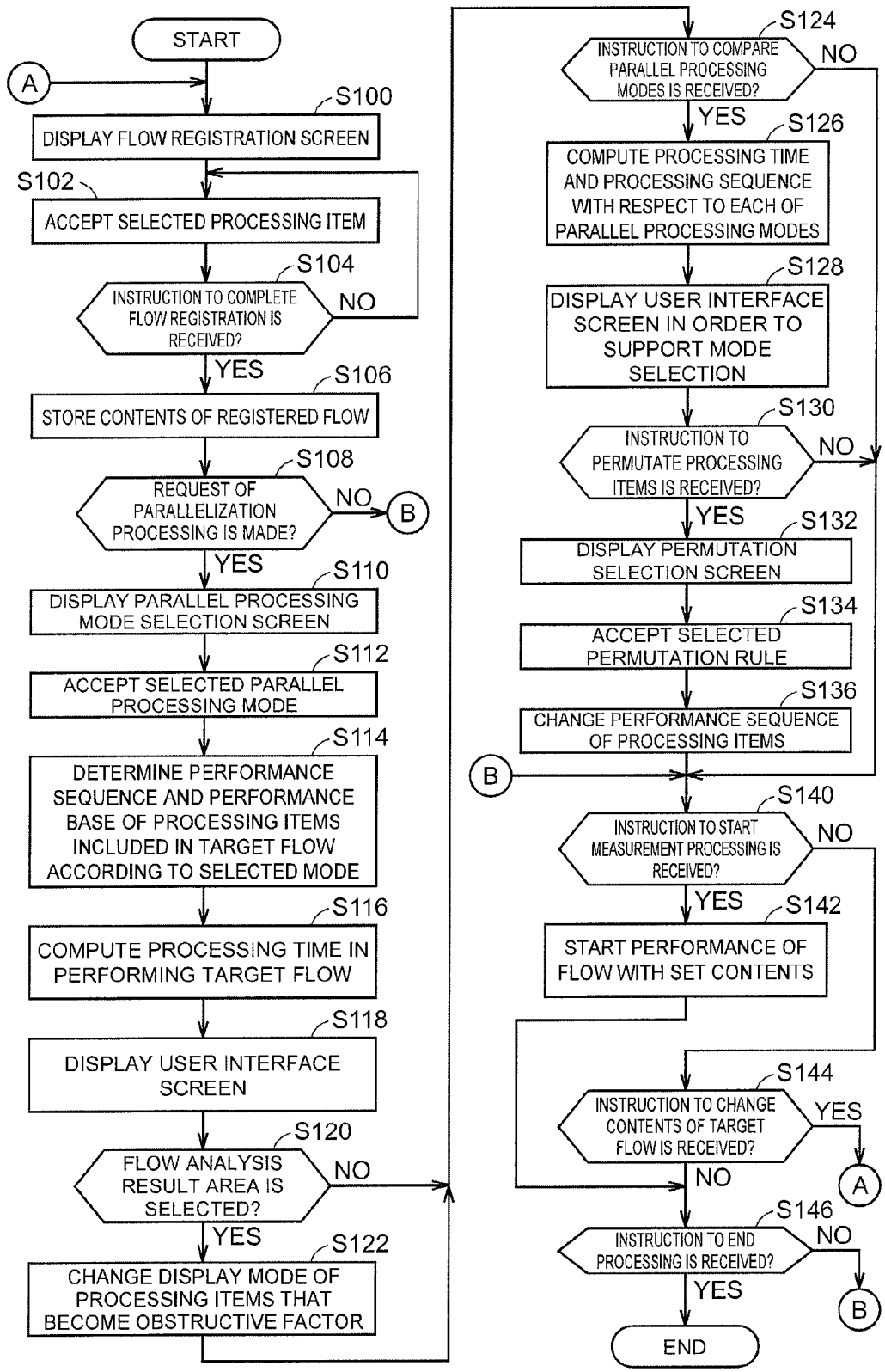
FIG. 16 is a flowchart showing a processing procedure according to the embodiment of the present invention.

FIG. 16 is a flowchart showing the processing procedure according to the embodiment of the present invention. Referring to FIG. 16, the image processing apparatus 100 displays the flow registration screen on the display 102 (step S100), and the image processing apparatus 100 accepts the processing item selected by the user (step S102). The image processing apparatus 100 determines whether an instruction to complete the flow registration is received from the user (step S104). When the instruction to complete the flow registration is not received from the user (NO in step S104), the pieces of processing in steps S102 and S104 are repeated.

When the instruction to complete the flow registration is received from the user (YES in step S104), the image processing apparatus 100 stores contents of the registered flow (step S106).

The image processing apparatus 100 determines whether a request of the parallelization processing is made (step S108). The processing goes to step S140 when the request of the parallelization processing is not made (NO in step S108).

When the request of the parallelization processing is made (YES in step S108), the image processing apparatus 100 displays the parallel processing mode selection screen (FIG. 3) on the display 102 (step S110) to accept the parallel processing mode selected by the user (step S112). The image processing apparatus 100 determines the performance sequence and performance base (the first core 110a and the second core 110b) of the processing items included in the stored target flow according to the selected parallel processing mode (step S114). The image processing apparatus 100 computes the processing time in performing the target flow with the single core and the processing time in performing the parallel processing to the target flow based on the contents determined in step S114 (step S116), and the image processing apparatus 100 displays the user interface screen based on the computation result (step S118). At this point, when the obstructive factor of the speed enhancement of the processing exists, the image processing apparatus 100 displays contents of the obstructive factor on the user interface screen (such as the flow analysis result area 410 shown in FIGS. 9 to 12).

The image processing apparatus 100 determines whether the user selects the flow analysis result area (step S120). When the user selects the flow analysis result area (YES in step S120), the image processing apparatus 100 changes the display mode of the processing items that become the obstructive factor of the speed enhancement of the processing (step S122). Then the processing goes to step S124.

When the user does not select the flow analysis result area (NO in step S120), the image processing apparatus 100 determines whether an instruction to compare the parallel processing modes is received from the user (step S124). The processing goes to step S140 when the instruction to compare the parallel processing modes is not received from the user (NO in step S124).

When the instruction to compare the parallel processing modes is received from the user (YES in step S124), the image processing apparatus 100 virtually determines the performance sequence and performance base of the processing items included in the stored target flow according to each of the previously set plurality of parallel processing modes, and the image processing apparatus 100 computes the processing time and processing sequence when the processing is performed by the determined contents (step S126). The image processing apparatus 100 displays the user interface screen in order to support the parallel processing mode selection based on the computation result in step S126 (step S128).

The image processing apparatus 100 determines whether an instruction to permutate the processing items included in the target flow is received from the user on the user interface screen that is displayed in step S128 in order to support the parallel processing mode selection (step S130). The processing goes to step S140 when the instruction to permutate the processing items included in the target flow is not received from the user (NO in step S130).

When the instruction to permutate the processing items included in the target flow is received from the user (YES in step S130), the image processing apparatus 100 displays the permutation selection screen (FIG. 14) on the display 102 (step S132), and the image processing apparatus 100 accepts the permutation rule selected by the user (step S134). The image processing apparatus 100 changes the performance sequence of the processing items included in the target flow according to the selected permutation rule (step S136).

The image processing apparatus 100 determines whether an instruction to start the measurement processing is received from the user (step S140). When the instruction to start the measurement processing is received from the user (YES in step S140), the image processing apparatus 100 starts the performance of the flow with the currently set contents (step S142).

When the instruction to start the measurement processing is not received from the user (NO in step S140), the image processing apparatus 100 determines whether an instruction to change contents of the target flow is received from the user (step S144). When the instruction to change contents of the target flow is received from the user (YES in step S144), the pieces of processing from the processing in step S100 are repeated.

When the instruction to change contents of the target flow is not received from the user (NO in step S144), the image processing apparatus 100 determines whether an instruction to end the processing is received from the user (step S146). When the instruction to end the processing is not received from the user (NO in step S146), the pieces of processing from the processing in step S140 are repeated. The processing is ended when the instruction to end the processing is received from the user (YES in step S146).

<Action and Effect>

In the image processing apparatus of the embodiment, the plurality of parallel processing modes are prepared, and the parallel processing is realized according to the selected parallel processing mode when the user arbitrarily selects one of the parallel processing modes. In the actual production line, various needs arise according to the capability and position in each line. Examples of the needs include the shortening of the measurement time, the shortening of the tact time, the cost reduction of the image processing apparatus, the reduction of down time (realization of online maintenance), and early cause investigation in case of trouble. In the image processing apparatus of the embodiment, the parallel processing modes are prepared according to the needs, and the user only selects the appropriate parallel processing mode, which allows the needs to be satisfied according to the target production line.

According to the image processing apparatus of the embodiment, general versatility can be enhanced because not the previously determined specific parallelization technique but the plurality of parallelization techniques can arbitrarily be selected. Therefore, the cost reduction can be realized as a whole compared with use of a dedicated machine specialized in a specific production line.

In image processing apparatus of the embodiment, the various user support functions are provided, so that the user can immediately recognize which parallel processing mode should be selected. That is, in the user interface screen 600 shown in FIG. 13, the effects of the speed enhancement of the parallel processing modes can be compared to each other. In the user interface 400 shown in FIG. 9 and/or the user interface 401 shown in FIG. 11, the user can immediately recognize the effect of the speed enhancement of the parallel processing compared with the use of the conventional single arithmetic processing section (when the parallel processing is not performed).

It is noted that the currently disclosed embodiment is described only by way of example and is not restrictive. The scope of the present invention is expressed by not the above description but claims, and meanings equivalent to claims and all the changes within claims should be included in the present invention.

What is claimed is:

1. An image processing apparatus comprising:
a camera interface section configured to be connected to an imaging section, the imaging section taking an image of an object to be measured to produce image data, the image data produced by the imaging section being inputted to the camera interface section;
a plurality of arithmetic processing sections configured to process the image data;
a display screen output section configured to be connected to a display section to output display image data to be displayed on the display section;
an input section configured to accept input from an outside;
a storage section configured to store a plurality of processing units configured to process the image data;
a processing registration section configured to register a processing procedure, the processing procedure comprising a combination of the processing units selected by the input from the input section and forming a flow;
a mode selection section configured to selectably display a plurality of parallel processing modes configured to respectively indicate different kinds of parallel processing on the display section and to accept the selection of the parallel processing mode from the input section; and
a parallelization section configured to allocate each of a plurality of processing units configured to process image data and included in a target processing procedure to one of the plurality of arithmetic processing sections according to the parallel processing mode selected by the mode selection section;
wherein corresponding arithmetic processing sections are configured to process corresponding processing units of the target processing procedure in parallelized flows, and the processing registration section is further configured to output the display data of the processing units included in the processing procedure according to a performance sequence determined by the input from the input section.

2. The image processing apparatus according to claim 1, further comprising a comparison display output section configured to display on the display section a first processing time necessary to process the target processing procedure with a single arithmetic processing section and a second processing time necessary to perform the parallel processing to the target processing procedure allocated with the parallelization section by the plurality of arithmetic processing sections.

3. The image processing apparatus according to claim 2, wherein the comparison display output section is configured to output the first processing time and the second processing time in the form of numerical display.

4. The image processing apparatus according to claim 2, wherein the comparison display output section is configured to output the first processing time and the second processing time in the form of graphic display.

5. The image processing apparatus according to claim 1, wherein the parallelization section comprises:

a section configured to determine whether an obstructive factor of speed enhancement of processing exists with respect to a processing unit included in the processing procedure; and a section configured to display a countermeasure that solves the obstructive factor on the display section when the obstructive factor of the speed enhancement of the processing exists.

6. The image processing apparatus according to claim 1, wherein the parallelization section comprises:

a section configured to compute a processing time for each of a plurality of parallel processing modes in which each of a plurality of processing units included in the target processing procedure are allocated to one of the plurality of arithmetic processing sections; and a section configured to output the computed processing time for each of the plurality of parallel processing modes to the display section such that the processing time for each of the plurality of parallel processing modes can be compared to each other among the parallel processing modes.

7. The image processing apparatus according to claim 1, further comprising a permutation section configured to change the performance sequence of the plurality of processing units included in the target processing procedure.

8. The image processing apparatus according to claim 1, wherein a position deviation correction processing unit is includes in the target processing procedure, wherein the parallelization section allocates the plurality of processing units to one of the plurality of arithmetic processing sections subsequently to the position deviation correction processing unit.

9. The image processing apparatus according to claim 1, further comprising:

an interface configured to:

display the processing procedure by displaying a series of a plurality of icons, each of the plurality of icons corresponding to one of the plurality of processing units; and add or delete the processing unit or to change the performance sequence of the processing units according to a manipulation including a drag and drop manipulation to the displayed icons by a user.

10. The image processing apparatus according to claim 1, further comprising an interface configured to display the flow and the parallelized flows in parallel, the flow and the parallelized flows being presented by a string of blocks, each block corresponding to one processing unit and having a width corresponding to processing time of the one processing unit.

* * * * *